(12) United States Patent
Kersten et al.

(10) Patent No.: US 8,965,793 B2
(45) Date of Patent: Feb. 24, 2015

(54) MULTI-ATTRIBUTE AUCTIONING METHOD AND SYSTEM

(75) Inventors: Gregory E. Kersten, Ottawa (CA); Shikui Wu, Lachine (CA)

(73) Assignee: Valorbec, Societe en Commandite, Montreal, QC (CA)

( * ) Notice: Subject to any disclaimer, the term of this patent is extended or adjusted under 35 U.S.C. 154(b) by 0 days.

(21) Appl. No.: 13/428,888

(22) Filed: Mar. 23, 2012

(65) Prior Publication Data

US 2012/0246020 A1 Sep. 27, 2012

Related U.S. Application Data

(60) Provisional application No. 61/467,365, filed on Mar. 24, 2011.

(51) Int. Cl.
*G06Q 30/00* (2012.01)
*G06Q 30/08* (2012.01)
*G06Q 30/06* (2012.01)

(52) U.S. Cl.
CPC ............ *G06Q 30/08* (2013.01); *G06Q 30/0611* (2013.01)
USPC ........................................ 705/26.4; 705/26.3

(58) Field of Classification Search
USPC ............................................... 705/26.3, 26.4
See application file for complete search history.

(56) References Cited

U.S. PATENT DOCUMENTS

| | | | |
|---|---|---|---|
| 5,924,082 A | 7/1999 | Silverman et al. | |
| 6,112,189 A | 8/2000 | Rickard et al. | |
| 6,952,682 B1 | 10/2005 | Wellman | |
| 7,200,570 B1 | 4/2007 | Wu | |
| 7,373,325 B1 | 5/2008 | Hadingham et al. | |
| 7,383,206 B2 * | 6/2008 | Rupp et al. | 705/26.3 |
| 7,406,443 B1 | 7/2008 | Fink et al. | |
| 7,475,034 B2 | 1/2009 | Coyne et al. | |
| 7,584,124 B2 | 9/2009 | Porat et al. | |
| 7,877,293 B2 | 1/2011 | Biebesheimer et al. | |
| 7,958,013 B2 | 6/2011 | Porat et al. | |
| 8,112,320 B2 | 2/2012 | D'Ambrosio et al. | |
| 2002/0065762 A1 | 5/2002 | Lee et al. | |
| 2004/0073502 A1 | 4/2004 | Agrawal et al. | |

(Continued)

OTHER PUBLICATIONS

David C. Parkes et al., Models for Iterative Multiattribute Procurement Auctions, Management Science Mar. 2005 vol. 51 No. 3 435-451.

(Continued)

*Primary Examiner* — Tsan-Yu J Huang
(74) *Attorney, Agent, or Firm* — Anglehart et al.

(57) ABSTRACT

A method and system for auctioning an auction item in a multi-attribute auction. A winning bid is selected by determining a secret value function indicative of acceptable combination of attribute values for the auction owner. The auction owner computing device or the auction server generates alternate combinations of attribute values based at least in part on the secret value function. To generate the alternate combinations of attribute values at least some of the combinations of attribute values are perturbed so as to hinder the bidders from deriving or finding the secret value function. The auction server informs the bidders, via a bidder interface of a client computing device, about the alternate combinations of attribute values and required biding directions. The bidder can offer a bid in a next round based on the alternate combinations of attribute values, in a progressive manner and without knowledge of the secret value function.

18 Claims, 26 Drawing Sheets

(56) References Cited

U.S. PATENT DOCUMENTS

| | | | |
|---|---|---|---|
| 2007/0150404 A1* | 6/2007 | Golle | 705/37 |
| 2010/0324974 A1 | 12/2010 | D'Ambrosio et al. | |

OTHER PUBLICATIONS

Elena Katok et al., Collusion in Dynamic Buyer-Determined Reverse Auctions, Management Science, 2011.

Jeffrey Teich et al., Multiple-issue auction and market algorithms for the world wide web, Decision Support Systems, vol. 26, Issue 1, Jul. 1999, pp. 49-66.

Lawrence M. Wein et al., An inverse-optimization-based auction mechanism to support a multi-attribute RFQ process, Management Science, vol. 49, No. 11, Special Issue on E-Business and ManagementScience (Nov. 2003), pp. 1529-1545.

Marie-Jo Bellosta et al., A multi-criteria model for electronic auctions, SAC '04 Proceedings of the 2004 ACM symposium on Applied computing pp. 759-765.

Marie-Jo Bellosta et al., A unified framework for multiple criteria auction mechanisms, Web Intelligence and Agent Systems: An International Journal 6 (2008) 401-419.

Martin Bichler et al., Configurable offers and winner determination in multi-attribute auctions, European Journal of Operational Research, 2005, vol. 160, issue 2, pp. 380-394.

Martin Bichler, An experimental analysis of multi-attribute auctions, Decision Support Systems, vol. 29, Issue 3, Oct. 2000, pp. 249-268.

Natalia Santamaria, An analysis of scoring and buyer-determined procurement auctions, Oct. 10, 2011.

Richard Engelbrecht-Wiggans et al., A Comparison of Buyer-Determined and Price-Based Multiattribute Mechanisms, Marketing Science Sep./Oct. 2007 vol. 26 No. 5 629-641.

Stefan Strecker et al., Electronic sourcing with multi-attribute auctions, System Sciences, 2004. Proceedings of the 37th Annual Hawaii International Conference.

Stefan Strecker, Information revelation in multiattribute English auctions: A laboratory study, Decision Support Systems, 49 (2010) 272-280.

Wedad Elmaghraby (2004), Auctions and Pricing in E-marketplaces, in Handbook of Quantitative Supply Chain Analysis: Modeling in the eBusiness Era, eds. D. Simchi-Levi, D. Wu, and Z.-J. Shen, Kluwer Academic Press.

Yagil Engel et al., Multiattribute Auctions Based on Generalized Additive Independence, Journal of Artificial Intelligence Research 37 (2010) 479-525.

* cited by examiner

Table 1. Value function compositions

| Attribute | Trademark | | | | | | Warranty (month) | | Price ($) | |
|---|---|---|---|---|---|---|---|---|---|---|
| Weight of attribute (y) | $w_1 = 0.3$ | | | | | | $w_2 = 0.2$ | | $w_3 = 0.5$ | |
| Attribute values (x') | Star | Citron | Pego | Bema | Reno | Lux | 0 | 60 | 10,000 | 50,000 |
| Weight of attribute value (w') | 0 | 20 | 40 | 60 | 80 | 100 | 0 | 100 | 100 | 0 |

Figure 14A

Table 2. Two alternative examples

| | Alternative 1 (x₁) | | | Alternative 2 (x₂) | | |
|---|---|---|---|---|---|---|
| | x' | w' | g | x' | w' | g |
| 1. Trademark | Reno | 80 | 24 | Pego | 40 | 12 |
| 2. Warranty | 36 | 60 | 12 | 24 | 40 | 8 |
| 3. Price | 40,400 | 24 | 12 | 30,800 | 48 | 24 |
| Utility | $u(x_1) = 48$ | | | $u(x_2) = 44$ | | |

Figure 14B

MULTI-ATTRIBUTE AUCTIONING METHOD AND SYSTEM

CROSS-REFERENCE TO RELATED APPLICATIONS

This application is non-provisional of U.S. Provisional Application Ser. No. 61/467,365, filed Mar. 24, 2011, which is incorporated herein by reference in its entirety.

TECHNICAL FIELD

The present relates to the field of auctions. More particularly, the present relates to the field of multi-attribute auctions.

BACKGROUND

E-procurement is a key area of e-business and supply chain management in which catalogs and reverse auctions have been widely used (Anderson and Frohlich, 2001; Jap, 2003). On average, about 70% of corporate revenue is spent on purchasing; savings of 5% translate into hundreds of millions of dollars (Peleg, 2003; Wagner and Schwab, 2004). Reverse auctions have been shown to achieve average gross savings of 15-20 percent (Cohn, 2000.)

There are two kinds of auctions: single-shot and iterative. Iterative auctions, which allow bidders to revise their bids, are becoming prevalent in procurement (Parkes and Kalagnanam, 2005). One of the limitations of auctions is that they use a single attribute (i.e., price), which leads to inefficient agreements (Strecker and Seifert, 2004) and is not practical in many business transactions (Teich, Wallenius et al., 2004). A survey by Ferrin and Plank (2002) found that over 90% of purchasing managers based their decisions on both price and non-price variables (e.g., durability, service, lead-time and trust).

Two types of iterative auctions are possible: synchronous and asynchronous. An auction is synchronous if every seller makes at most one bid in each round. The auction mechanism—acting on behalf of the buyer—selects the best bid as the reference bid and presents it to the sellers. The sellers use the reference bid to construct their bids in the next round bid. In addition, the buyer may provide other information to help sellers construct their bids. Asynchronous auctions allow sellers to bid at any time until the auction's deadline. The most recent best bid is shown to the bidders. If a better bid is submitted then it replaces the previous best bid.

Auction design has traditionally focused on the construction of rules which govern the behavior of auction participants so that their auctions lead to a desired market outcome. The outcome is the final allocation of the goods and money. The desired aspect of the outcome is the auction initiator (the buyer in our case), profit or revenue maximization, or it is the creation of an efficient market (Kittsteiner and Ockenfels, 2006). The rules specify the winner determination formula, auction duration and the type of deadline (extendible or fixed), types of bids (sealed or open), and so on.

In synchronous iterative single-attribute auctions the rules determine whether: (1) all bids are open and posted so that they are visible to all bidders; (2) only some bids are open and visible; or (3) only the best bid made in a given round is open and visible. Either of these options is sufficient for the bidders to decide on bidding in the next round. Therefore, the rule defining an acceptable bid is simple—every submitted bid must exceed the last posted bid. This rule assures that the time-order of bids is the same as the profit-order for the buyer, that is, later bids are better than earlier. The concept "better than" is easily operationalized by the explicit auction criterion, which is the single attribute.

Procurement of more complex goods and services often requires consideration of multiple attributes (e.g., total costs of ownership components, quality, risk, and schedules). Survey results show that most procurement officers make purchasing decisions based on the total costs of ownership (Ferrin and Plank, 2002; Talluri and Ragatz, 2004)

Multi-attribute auctions cannot have a "better than" rule because there is no single auction criterion that is: (1) explicit and known to all participants; and (2) completely describes bids so that they can be ordered. Ways to overcome the lack of an explicit criterion include: (1) evaluation and selection of multi-attribute bids only after they are submitted (U.S. Pat. No. 7,200,570 B1, 2007); (2) pre-selection of bidders so that only bidders who are known to meet the additional criteria are included; (3) giving incumbents an advantage because their qualifications are known; and (4) the use of disclaimers such as "the lowest bid may not be awarded the contract" (Bichler and Kalagnanam, 2005; Engelbrecht-Wiggans, Haruvy et al., 2007; Schoenherr and Mabert, 2007). In these types of auctions either the selection or bidding process are modified so that a single-attribute auction can be used.

The results of such auction modification are mixed. Post-auction evaluation either requires that bidders know the buyer's evaluation function or renders multi-round and synchronous auction inadmissible because the bidders are unable improve their bids. These auctions may also lead to collusion and selection of inferior offers (Elmaghraby, 2004; Katok and Wambach, 2011). In some situations the process becomes an auction in name only, as is the case with an auction in which neither the winner nor any other participant is awarded the contract (Engelbrecht-Wiggans, Haruvy et al., 2007).

Another, seemingly simple approach is to give bidders all information which the buyer uses in order to analyze and compare bids (Chen-Ritzo, Harrison et al., 2005; Karakaya and Köksalan, 2011; Srinath, Singh et al., 2011). This requires specification of the buyer's evaluation function which is defined on the good or service attributes. A number of method used to construct such a function has been proposed (U.S. Pat. No. 7,584,124 B2, 2009) (see also, Bichler, 2000; Beil and Wein, 2003; Bellosta, Kornman et al., 2008).

This somewhat complicates the computation because the bidders need to optimize using both their own and the buyer's information (e.g., utility or a scoring function). It may also encourage the buyer to engage in strategic misrepresentation and announce a utility function with the aim of pushing the sellers to make favorable bids (Burmeister, Ihde et al., 2002).

This approach is, however, unacceptable when buyers do not want to disclose their preferences for strategic, competitive, or other reasons (Burmeister, Ihde et al., 2002; Parkes and Kalagnanam, 2005). In the context of multi-attribute bidding, this means that the bidders do not know how to bid; they cannot make tradeoffs that take the buyer's preferences into account and they may misinterpret the buyer's preferential directions. The bidders may make strong assumptions about the buyer's utility and bid accordingly. This may be acceptable if their knowledge of the buyer's preferences is accurate and the buyer accepts an inefficient winning bid.

Another option has been proposed by economists. This option rests on the assumption that all attributes can be expressed in monetary terms so that only two items need to be considered: (1) price, and (2) all remaining and monetized attributes, which typically represent costs—for the sellers and value (income)—for the buyer. When an assumption is added that these two terms are monotonic and the buyer compares bids using the difference between value and price, then the sellers can partially determine the buyer's preferential order of the alternatives.

The attribute monetization methods have been widely implemented and tested (e.g., Che, 1993; Strecker and Seifert, 2004; Bichler and Kalagnanam, 2005), and they are considered a standard in the auction literature (Parkes and Kalagnanam, 2005). These methods, based on two-attribute monetary value functions, are appealing because they allow buyers and sellers to integrate and trade off all attributes included in the cost function (Strecker and Seifert, 2004). On one hand, the bidder may choose a bid among his/her indifferent alternatives (i.e., different bids which yield the same utility for this bidder) that yields the highest utility to the buyer; on the other hand, the owner evaluates bids based on the total utility of bids and chooses the highest one. The limitation of this method is the underlying assumption that all attributes can be measured with money. The assumption is questionable, if one considers such attributes as trust, brand, or color.

The design of auction mechanisms that rely on attribute monetization involves the construction of rules that help the sellers to make progressive bids; i.e., bids which are better for the buyer than the bids made earlier. The information conveyed to the sellers is about the buyer's preferences and it is either complete or incomplete but sufficient to assure the auction convergence. A different approach has been proposed by Teich, Wallenius et al. (1999) in which the sellers are informed about a path in the space of alternatives. However, the buyer's preferences could consist of confidential information that the buyer would prefer not revealing to the sellers, thus discouraging the buyer from participating.

Other work that has taken place in the area of providing means for multi-attribute reverse auctions is reflected in the patents in this area.

U.S. Pat. No. 6,112,189, 2000 describes a system that supports multi-attribute negotiations among multiple parties. The parties exchange alternatives (bids) and provide the secure system with their satisfaction functions. The system calculates overall joint satisfaction and selects an alternative that maximizes joint satisfaction. This approach replaces market system with a central unit (controller) that has all required information and uses it to provide all participants with a single "best for all" solution.

U.S. Pat. No. 5,924,082 describes a method for the determination of a multi-attribute (multi-category) quality-of-service agreement. This as well as the U.S. Pat. No. 7,200,570 describes a single-step procedures so that market participants (sellers) cannot propose alternative and improved bids.

U.S. Pat. No. 7,373,325 describes a method for performing automated reverse auctions on an electronic network. The method modifies the auction with n bidders to n bilateral negotiations; in each the buyer negotiates with one seller. The process requires the buyer's active involvement and replaces an auction market mechanism with multiple bilateral negotiations.

U.S. Pat. No. 7,406,443 describes multi-dimensional trading method which requires double-auction system in which sellers submit at least four-attribute (dimensions) bids. These bids are matched to requests; if no match on all dimensions is obtained matching on fewer dimensions is undertaken. The process does not allow for auctions with fewer than four attributes, does not allow for trade-offs and requires the presence of multiple buyers.

U.S. Pat. No. 7,475,034 describes a process for the specification of an auction methodology for based on the auction scope, type of interaction, control, pricing and closing rules. This process does not address multi-attribute aspects of the goods or services and heterogeneity of the bidders.

U.S. Pat. No. 7,877,293 B2 (2011) describes a pull system that allows buyers of bundled services to compare offers. The comparison is based on multiple-attribute decision support mechanism which aggregates attribute values and constructs ratings for the bundles. The method focuses on the buyer and it does not provide information and bidding directions that would facilitate bid construction.

U.S. Pat. No. 7,958,013 B2 (2011) describes a methodology and system for a fully automated buyer's auction in which both the buyer and the sellers have near-perfect information about one another, including information about the buyer's preferences and offers made by the competing sellers. Although the information requirement is not complete, but near-perfect, it does not allow for buyers' auctions when the buyers do not want or cannot disclose their own preferences and the sellers do not have information about each other.

U.S. Pat. No. 8,112,320 B2 (2012) describes a method for multiattribute web content auctions. The method allows for the submission bids that include non-price attributes, which are converted to price through the use of a willingness-to-pay function. This function is based on the auction knowledge of the bid-maker. The bid-maker receives price for the bid which may be used to revise the bid. The application of this method is narrow and the underlying assumption is that the buyer can construct a willingness-to-pay function for each buyer and that each bidder can construct a bid that will yield a different price value.

SUMMARY

Rather than informing the sellers about preferential direction(s) and/or alternatives preferred over any given alternative, the information to the acceptable alternatives is restricted so that no preferential information need be conveyed while assuring that no alternative is removed which could yield the desired outcome.

According to one aspect, there is a multi-attribute auction system that allows bids to be iteratively offered to an auction owner. The auction system has a value function calculator, a bid collector, a ranking module, a value function perturbator and a guiding module.

The value function calculator is adapted to calculate a secret value function based on acceptable combinations of attribute values for the auction owner. The acceptable combinations of attribute values are based on any form of attributes or combinations of forms of attributes according to which the auction owner is interested in receiving bid offers.

The attributes may be related to various types of economic parameters such as cost, revenue, profit, utility, etc. or any other kind of parameter that can desirably affect the competitiveness, efficiency or performance of the auction owner. Consequently, the calculated secret value function can also be a cost function, a revenue function, a utility function or any other type of economic parameter function or a combination thereof. In one case, the attribute is a bidder category indicator by which groups of bidders are ranked according to a preference ranking set by the auction owner. The preference ranking being set according to at least one preference criteria. The calculated secret value function can then include a bidder category ranking function. The secret value function is to be hidden from the bidders for preventing them from knowing about the auction owner's trade information that may be classified as confidential.

The bid collector is adapted to receive a bid indicative of a combination of attribute values offered by the bidder. The bidder offers a bid without knowledge of the secret value function. Within a bidding round, a plurality of bidders may each offer a bid, the bid collector receives the bid and stores each bid within the system by associating each bid to a corresponding bidder.

The ranking module is adapted to compare each of the bids received by the bid collector with the calculated secret value function. The bid being ranked the highest according to the secret value function is determined to be the winning bid or best bid for the bidding round. In a multi-attribute auction, the winning bid is determined on a combination of attributes and can only be determined based on the auction owner's preference which is represented by the secret value function.

The value function perturbator is adapted to generate alternate combinations of attribute values that are based at least in part on the secret value function. The perturbator generates alternate combinations of attribute values by applying a perturbation to the combinations of attribute values of the secret value function. The combinations of attribute values are perturbed to prevent or hinder the plurality of bidders from finding or deriving the secret value function.

According to yet another aspect, there is a method for auctioning an auction item in a multi-attribute auction. Bids are iteratively offered to an auction owner by a plurality of bidders. According to one embodiment, the bids are iteratively offered to an auction owner through an auction owner interface of a client computing device by a plurality of bidders through the bidder interface of a client computing device.

To select a winning bid or best bid, there is determined a secret value function that is indicative of acceptable combination of attribute values for the auction owner. In the method, the auction server receives the secret value function from the auction owner and receives bids from the bidders. The auction server further generates alternate combinations of attribute values based at least in part on the secret value function.

For automated generation of the alternate combinations of attribute values at least some of the combinations of attribute values are perturbed so as to prevent or hinder the bidders from deriving or finding the secret value function. The auction server informs the bidders, via a bidder interface of a client computing device, about the alternate combinations of attribute values and required biding directions. With this information, the bidder can offer a bid in the next round based on the alternate combinations of attribute values, in a progressive manner and without knowledge of the secret value function.

The alternate combinations of attribute values and required biding directions may be generated in between two consecutive rounds or they may be calculated at any point in time defined by auction rules. One such rule is that after bids are received from n (n>1), different bidders, a predefined time t (t>0) is added to the time $t_n$ when the last bid was made. At time $t_n$+t new alternate combinations of attribute values and required biding directions generated and displayed to bidders. This allows to provide the bidders with a semi-synchronous multi-attribute reverse auction procedure.

In the semi-synchronous auction procedure, rounds may be distinguished by the system but not by the bidders. This is because the round time is flexible; in a single auction the round time may vary from a few seconds to several hours or days. There is no a priori pre-specified round time; instead, the move to the next round is governed by additional rules (e.g., number of bidders require to make move to the next round, time added to the last bid time, and time to the auction deadline). Hence, like in a synchronous procedure, the bidders' actions control the move from one round to another.

In the semi-synchronous procedure one bidder may not bid, make one bid or make multiple bids in a single round.

Several different packages of the alternate combinations of attribute values and required biding directions may be generated in any given auction. This allows to differentiate between bidders according to their reputation, reliability, and other attributes of the bidders as opposed to the good or service attributes. For example, less known and reputable bidders may still participate in the auction but they receive more stringent alternate combinations of attribute values than better known and more reputable bidders.

A bidder may evaluate alternate combinations of attribute values, generate and evaluate bids based on their own private economic parameters such as revenue, profit, utility, etc. or any other kind of parameter that can desirably affect the competitiveness, efficiency or performance of the bidder. Consequently, the calculated bidder secret value function can also be a revenue function, a profit function, a utility function or any other type of economic parameter function or a combination thereof.

BRIEF DESCRIPTION OF THE DRAWINGS

The invention will be better understood by way of the following detailed description of embodiments of the invention with reference to the appended drawings, in which:

FIG. 14A is a table presenting value function compositions, according to an embodiment;

FIG. 14B is a table presenting utility calculations for two alternatives based on the value function compositions of FIG. 14A, according to an alternate embodiment;

DETAILED DESCRIPTION

Figure 1A:
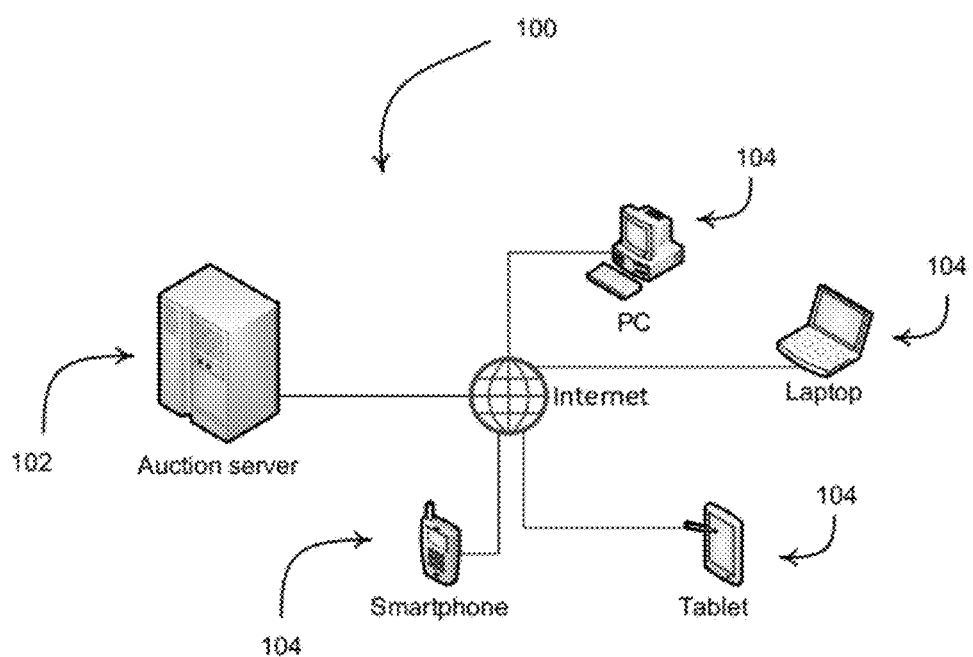
FIG. 1A is a diagram of the auctioning system comprising an auction server that is adapted to run a bidder engine, according to an embodiment.
Figure 1B:
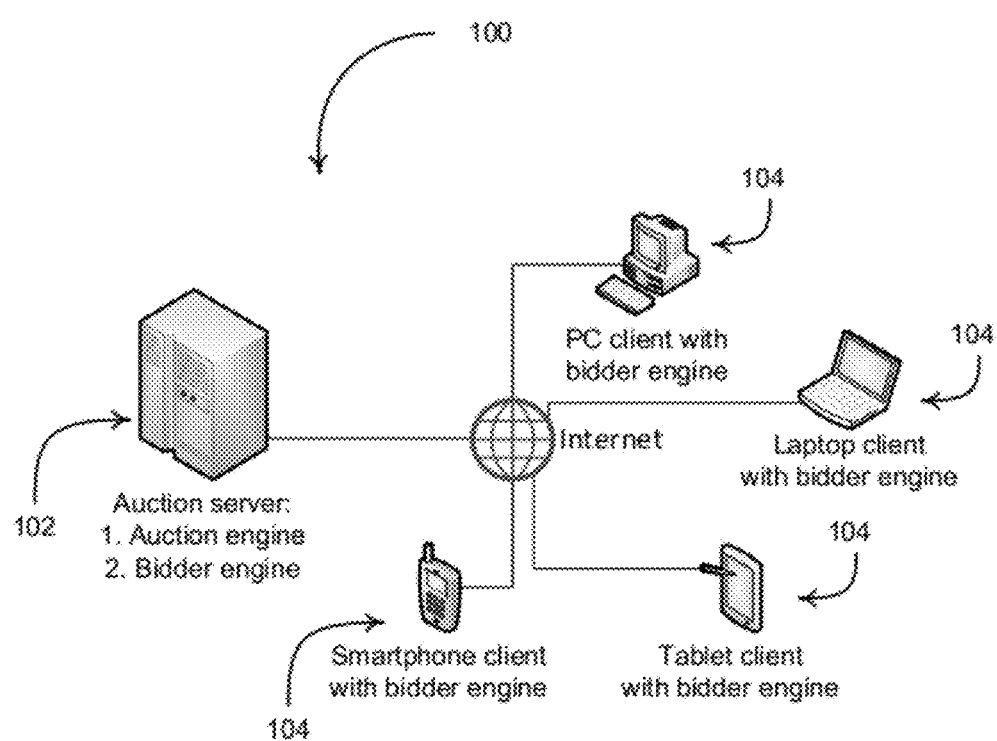
FIG. 1B is a diagram of the auctioning system comprising client computing devices that are adapted to run a bidder engine, according to an embodiment.
Figure 1C:
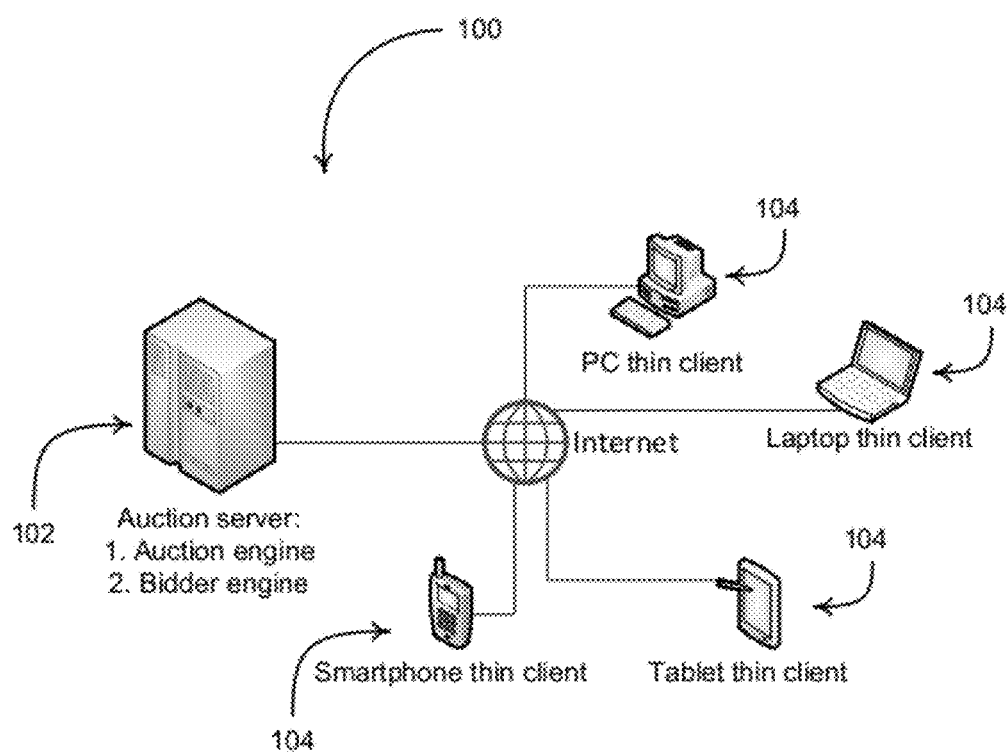
FIG. 1C is a diagram of the auctioning system comprising client computing devices that are thin clients, according to an embodiment.

Presented in FIGS. 1A, 1B and 1C, there is an auction system 100 having an auction server 102 and a plurality of client computing devices 104 that are each connected to a telecommunication network such as the Internet. The auction server 102 can be any type of computing device that is suitable for running an auction engine and the client computing devices 104 can be any type of computing device that is suitable for allowing a bidder to participate in the auction.

Figure 2:
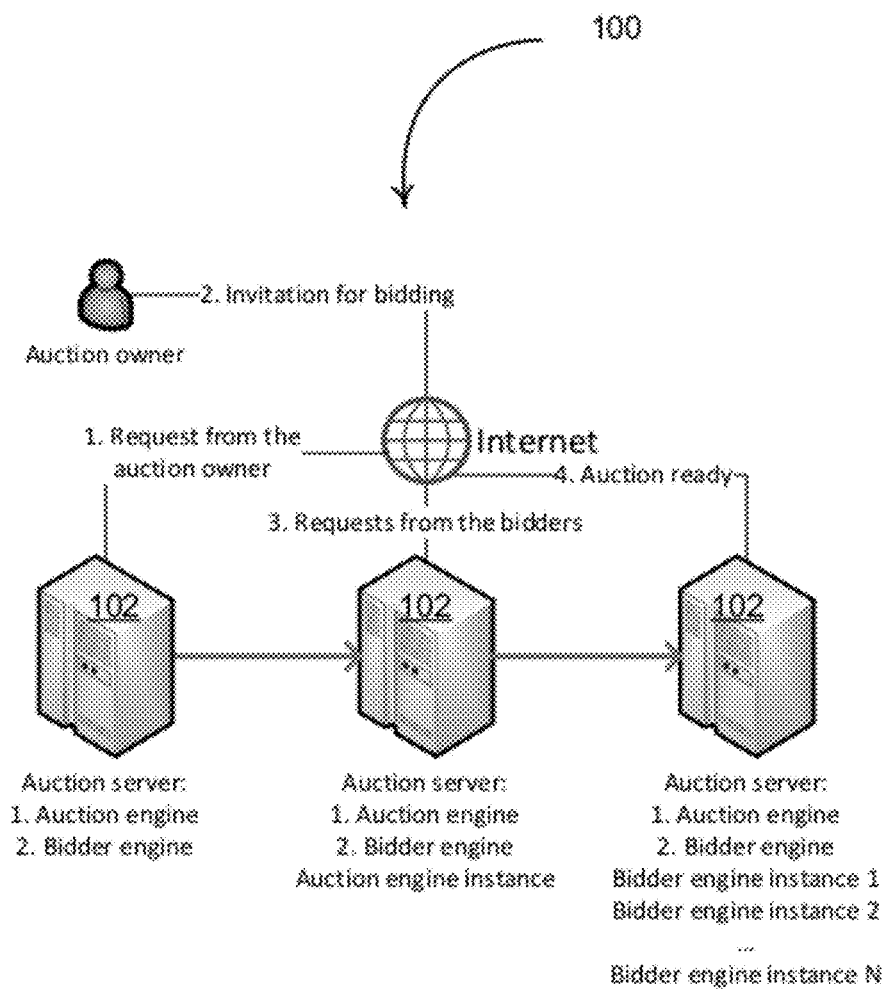
FIG. 2 is a diagram of the auctioning system illustrating various instantiations generated with the auction server, according to an embodiment.

In FIG. 2 there is presented a method of establishing an auction session in the auction server 102, according to one embodiment. The auction owner sends a request to the auction server 102 through a telecommunication network such as the Internet. Depending on the auction, the auction owner may specify various credential information and set various auction criterion that will be further explain in more detail below. In response, the auction server 102 creates an auction engine instance and the auction owner sends an invitation to potential interested parties for participating in the auction. The parties that are interested to participate send a request to the auction server 102 for being registered as a bidder in the instantiated auction. For each party that registers as a bidder, there is a bidder instance that is created. Once all the bidder instances are created, the auction can commence. Although not shown, a skilled reader will understand that the auction owner and the bidders use a client computing device 104 to communicate with the auction server 102.

Figure 3A:
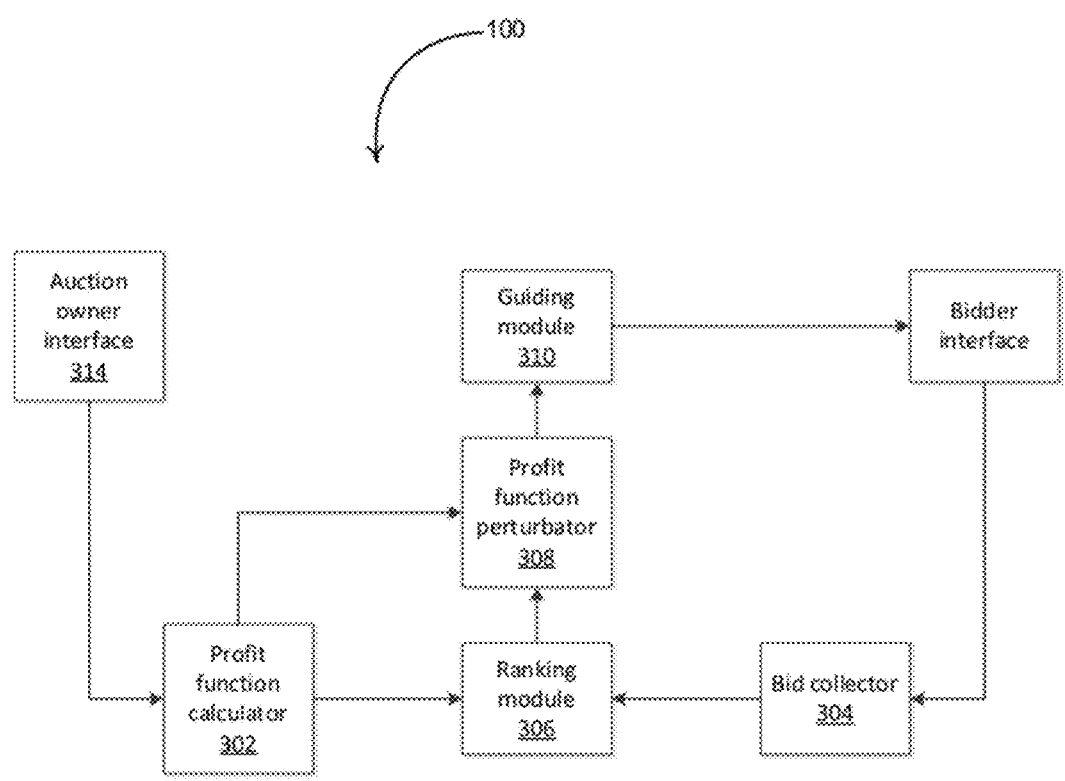
FIG. 3A is a block diagram of the auctioning system, according to an embodiment.

According to one aspect of the present auction system 100, the auction system 100 is a multi-attribute auction system that allows bids to be iteratively offered to an auction owner, the bids being iteratively offered by a plurality of bidders. Presented in FIG. 3A, there is the auction system 100 that has a value function calculator 302, a bid collector 304, a ranking module 306, a value function perturbator 308 and a guiding module 310.

The value function calculator 302 is adapted to calculate a secret value function based on acceptable combinations of attribute values for the auction owner. The acceptable combinations of attribute values are based on any form of attributes or combinations of forms of attributes according to which the auction owner is interested in receiving bid offers. The attributes may be related to various types of economic parameters such as cost, profit, utility, etc. or any other kind of parameter that can desirably affect the competitiveness, efficiency or performance of the auction owner. Consequently, the calculated secret value function can be a profit function, a cost function, a utility function or any other type of economic parameter function or combinations thereof. The secret value function is to be hidden from the bidders for preventing them from knowing about the auction owner's trade information that may be classified as confidential. There are various methods known to the skilled person in the art for calculating a value function based on acceptable combinations of attribute values and those methods are not being described in the present.

The bid collector 304 is adapted to receive a bid indicative of a combination of attribute values offered by the bidder. The bidder offers a bid without knowledge of the secret value function and the bid collector 304 stores the bid in memory or in a database of the system. Within a bidding round, a plurality of bidders may each offer a bid, the bid collector 304 receives the bid and stores each bid within the system by associating each bid to a corresponding bidder.

The ranking module 306 is adapted to compare each of the bids received by the bid collector 304 with the calculated secret value function. The bid being ranked the highest according to the secret value function is determined to be the winning bid or best bid for the bidding round. A skilled person will understand that in a multi-attribute auction, the winning bid is determined on a combination of attributes and can only be determined based on the auction owner's preference which is represented by the secret value function.

The value function perturbator 308 is adapted to generate alternate combinations of attribute values that are based at least in part on the secret value function. The perturbator 308 generates alternate combinations of attribute values by applying a perturbation to the combinations of attribute values of the secret value function. As presented in graphs 506 and 508 of FIG. 5B, the perturbation can be a slight displacement of a point such as $X_{r2}$ within a space of combinations of attribute values $X_2^A$ to a point $X_{r2}$ for generating the alternate combinations of attribute values $X_{2E}^A$. The combinations of attribute values are perturbed to prevent or hinder the plurality of bidders from finding or deriving the secret value function.

According to one embodiment, perturbator 308 generates alternate combinations of attribute values also by taking into consideration the winning bid or best bid of the round determined by the ranking module 306.

The guiding module 310 is adapted to send at least some of the alternate combinations of attribute values to the bidders. The guiding module 310 is adapted to send next round bidding information to the bidders for guiding them to bid in a progressive manner according to the auction owner's preferences.

According to one embodiment, a subgroup of the alternate combinations of attribute values is selected for sending to a corresponding bidder. The subgroup is bidder specific based on the last bid offered by the bidder.

Figure 3B:
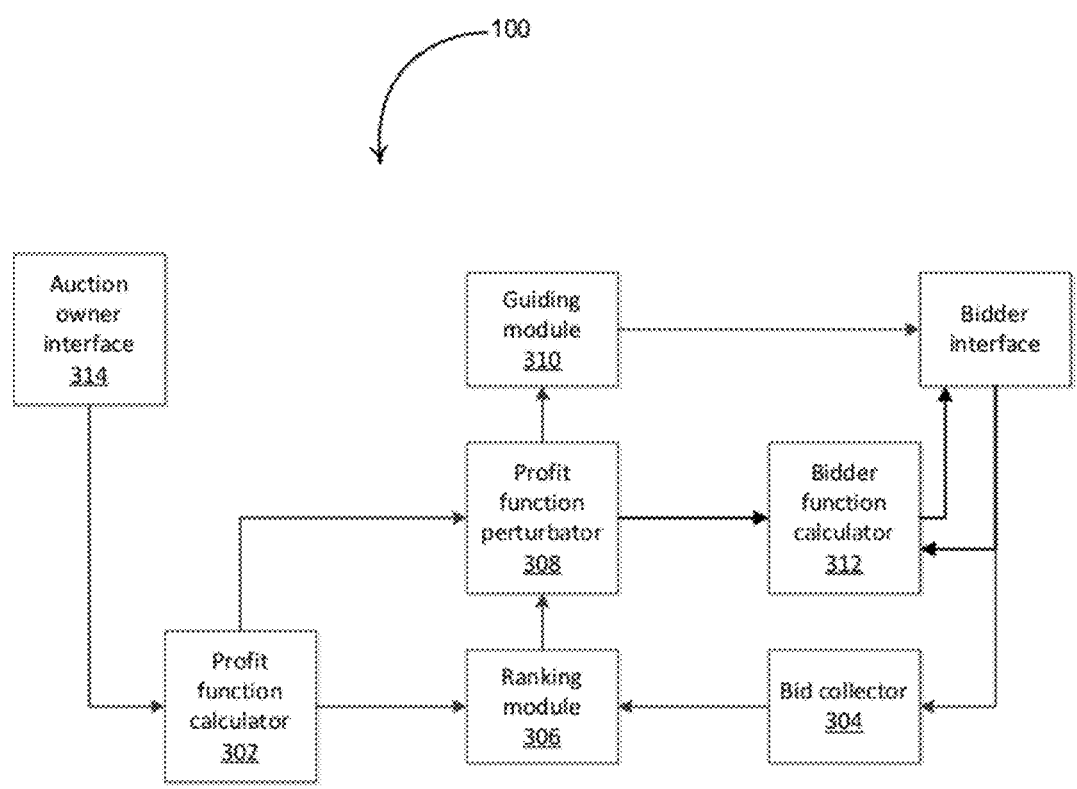
FIG. 3B is a block diagram of the auctioning system, according to an embodiment.

Presented in FIG. 3B there is the auction system 100 with a bidder value function calculator 312. The calculator 312 is adapted to calculate a bidder value function based at least in part on acceptable combinations of attribute values for the bidder. As with the auction owner, the acceptable combinations of attribute values are based on any form of attributes or combinations of forms of attributes according to which the bidder is interested or capable to offer. The attributes may be related to various types of economic parameters such as cost, profit, utility, etc. or any other kind of parameter that can desirably affect the competitiveness, efficiency or performance of the auction bidder. The calculated bidder value function can be a profit function, cost function, a utility function or any other type of economic parameter function or combinations thereof.

The bidder value function is bidder specific and need not be revealed to any other one of the bidders or to the auction owner, it is used as a tool for the bidder to make an offer that is aligned with his preferences.

According to one embodiment, the bidder value function calculator 312 is further adapted to calculate the bidder value function based on the acceptable combinations of attribute values for the auction owner or on the alternate combinations of attribute values generated by the value function perturbator 308. The bidder is guided in offering attribute values that are both progressive and aligned with his preferences.

In FIG. 1B according to one embodiment, the client computing devices 104 each have a bidder engine. The bidder engine is adapted to calculate a value function locally on the client computing device 104 with the calculator 312. The auction server 102 also has a bidder engine. The bidder engine of the auction server 102 is adapted to calculate alternate combinations of attribute values based on the value function of the bidder with calculator 312.

In FIG. 1C according to one embodiment, the client computing devices 104 are adapted to each send a value function acceptable to the corresponding bidder to the auction server 102. The bidder engine of the auction server 102 is adapted to calculate the value function for each bidder with the calculator 312. The bidder engine of the auction server 102 is then adapted to calculate alternate combinations of attribute values based on the value function of the bidder.

According to another aspect of the present, there is the client computing device 104 that is adapted to transceiver auction data to the multi-attribute auction server 102. The client computing device 104 allows the auction owner to participate in the multi-attribute auction in that it has an interface 314 for allowing her to at least submit her acceptable combinations of attribute values to the server 102. According to one embodiment, the interface 314 allows the auction owner to submit her acceptable combinations of attribute values individually to the value function calculator 302. In an alternate embodiment, the interface 314 allows the auction owner to submit her acceptable combinations of attribute values by submitting a pre-calculated value function to the auction server 102 or the value function perturbator 308.

Figure 3C:
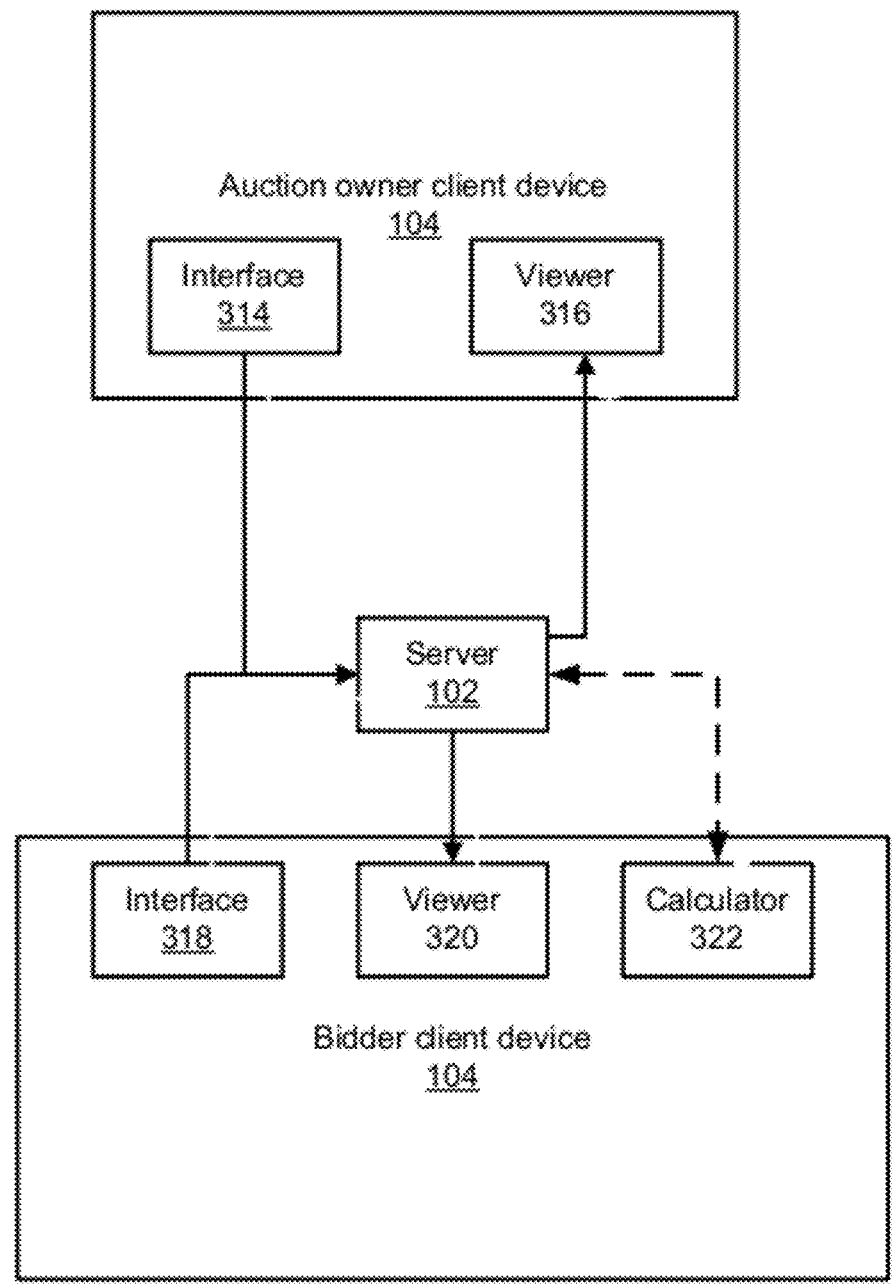
FIG. 3C is a block diagram of the auctioning system with a server, an auction owner client device and a bidder client device, according to an embodiment.

Presented in FIG. 3C, according to yet another embodiment, the client computing device 104 has an auction status viewer 316 and allows the auction owner to monitor the multi-attribute auction.

According to yet another aspect of the present, the client computing device 104 is a bidder client computing device 104 that is adapted to connect to the auction server 102 and allows a bidder to participate in the auction. The computing device 104 has an interface 318 for submitting a bid to the auction server 102 and an auction status viewer 320 for monitoring the auction.

According to one embodiment, the client computing device 104 has a bidder value function calculator 322 adapted to calculate the bidder value function locally on the client device 104. In this embodiment, the interface 318 is further adapted to submit the bidder value function to the auction server. As mentioned above, the bidder value function is based at least in part on acceptable combinations of attribute values for the bidder.

As in the auction server 102, the local bidder value function calculator 322 can also calculate the bidder value function by taking into consideration the alternate combinations of attribute values. The dashed arrow linking 322 and 318 indicates that the bidder does not have to use the bidder organization function that values the bid value, instead the bidder may specify the attribute values without measuring their total value.

Figure 3D:
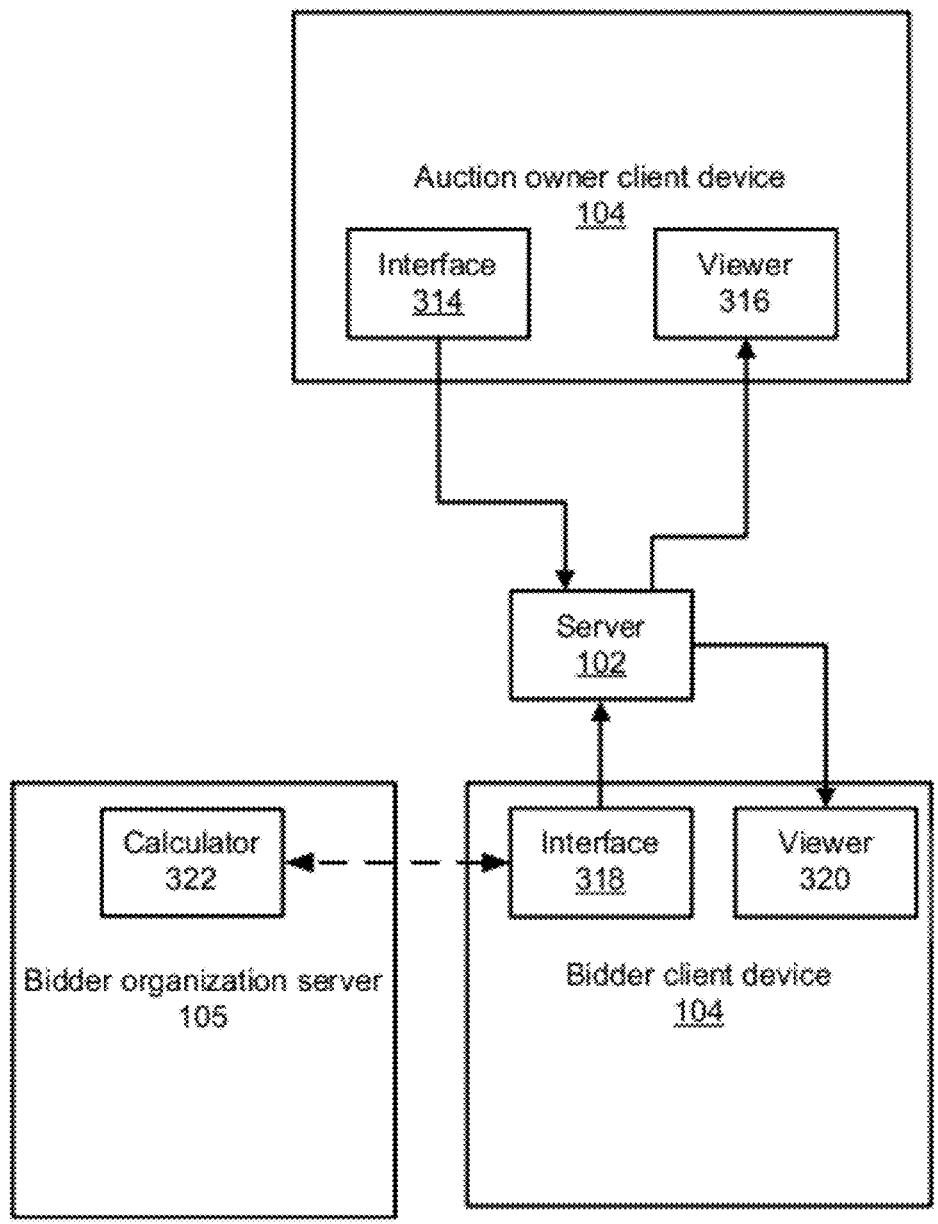
FIG. 3D is a block diagram of the auctioning system with a server, an auction owner client device and a bidder (thin) client device which obtains from a bidder organization server the values of the bid secret value function, according to an embodiment.

In an alternate embodiment as presented in FIG. 3D, the bidder client device is a thin client which obtains from a bidder organization server 105 the values of the bid secret value function, which is not transferred to the auction server. The bidder organization server 105 has the bidder value function calculator 322 and is adapted to calculate the bidder value function for the client device 104. The dashed arrow linking 322 and 318 indicates that the bidder does not have to use the secret function, instead the bidder may specify the attribute values without measuring their total value.

Figure 4A:
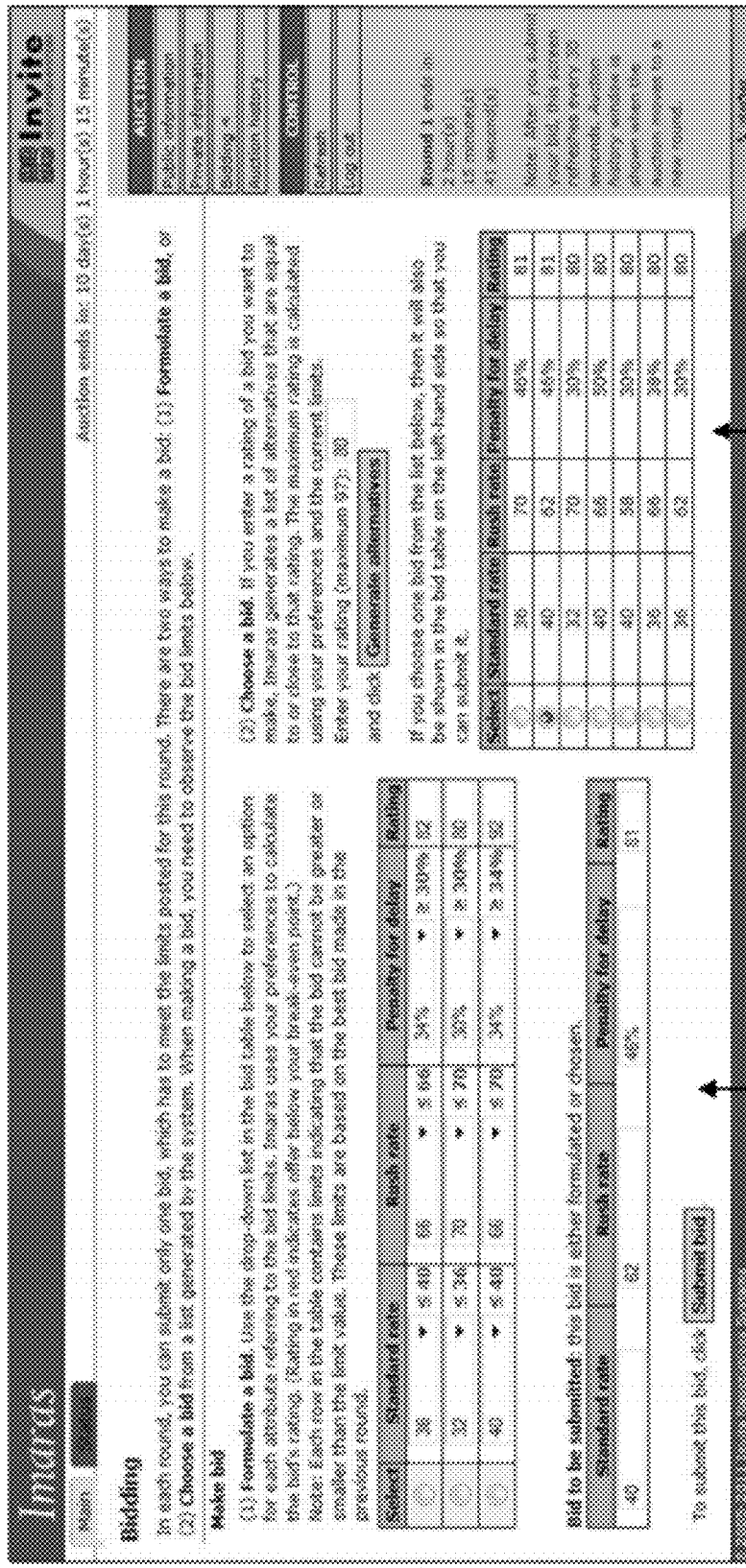
FIG. 4A is an illustration of a user interface of the bidder client device, according to an embodiment.

Presented in FIG. 4A according to one embodiment of the auction status viewer 320, there is displayed a group of an alternate combinations of attribute values 402 that are based at least in part on a secret value function of an auction owner. To prevent the bidder from deriving the secret value function, at least some of the combinations of attribute values are perturbed.

Further presented in FIG. 4A according to another embodiment of the auction status viewer 320, there is an interface 404 for submitting a bid based on the alternate combinations of attribute values.

Figure 4B:
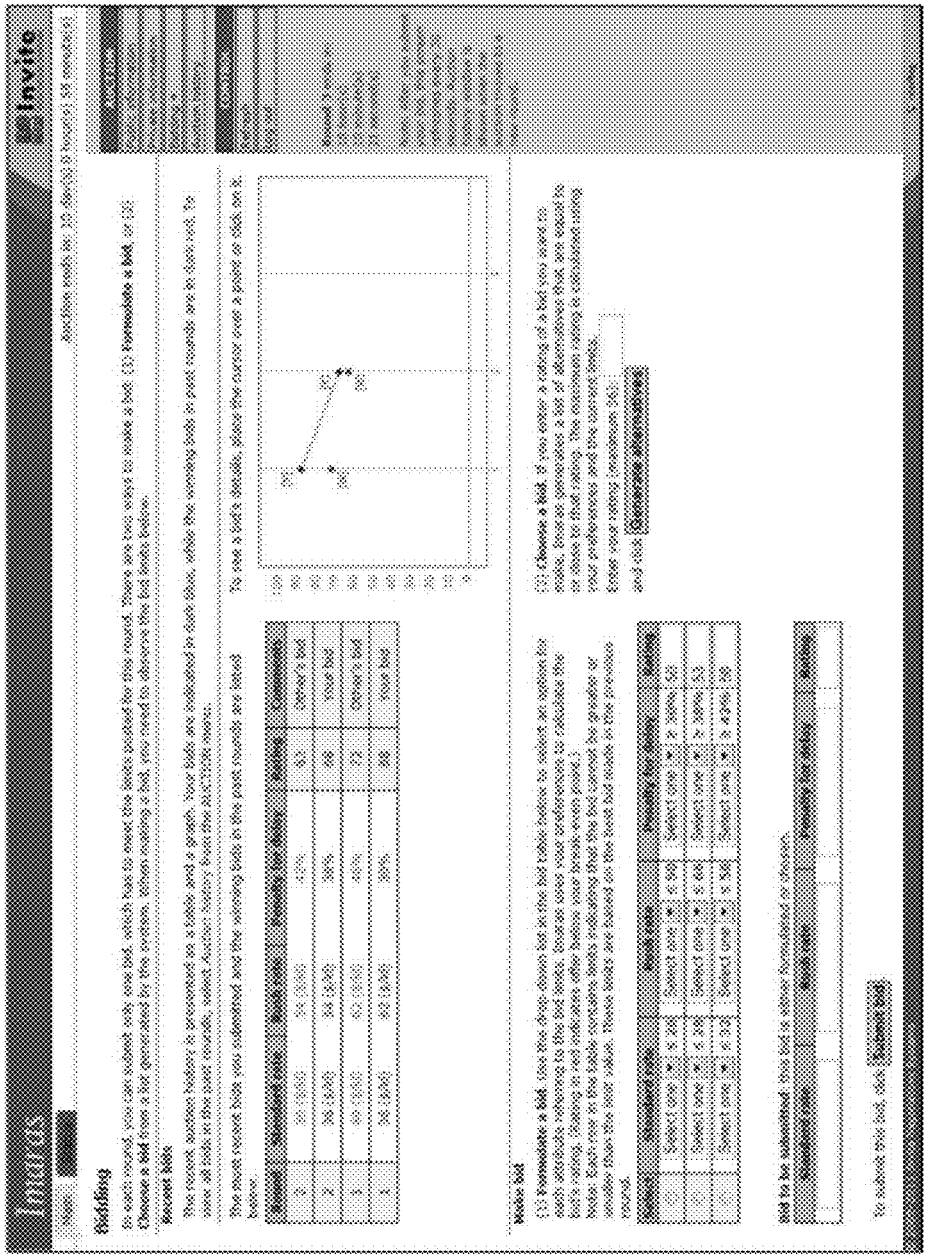
FIG. 4B is an illustration of a user interface of the bidder client device in a synchronous auction, according to an embodiment.

Presented in FIG. 4B according to one embodiment of the auction status viewer 320, there is a user interface of the bidder client device in a synchronous auction. The user interface presents a listing 406 of the bids such as the most recent bids that the bidder submitted and the winning bids of the past rounds.

Figure 4C:
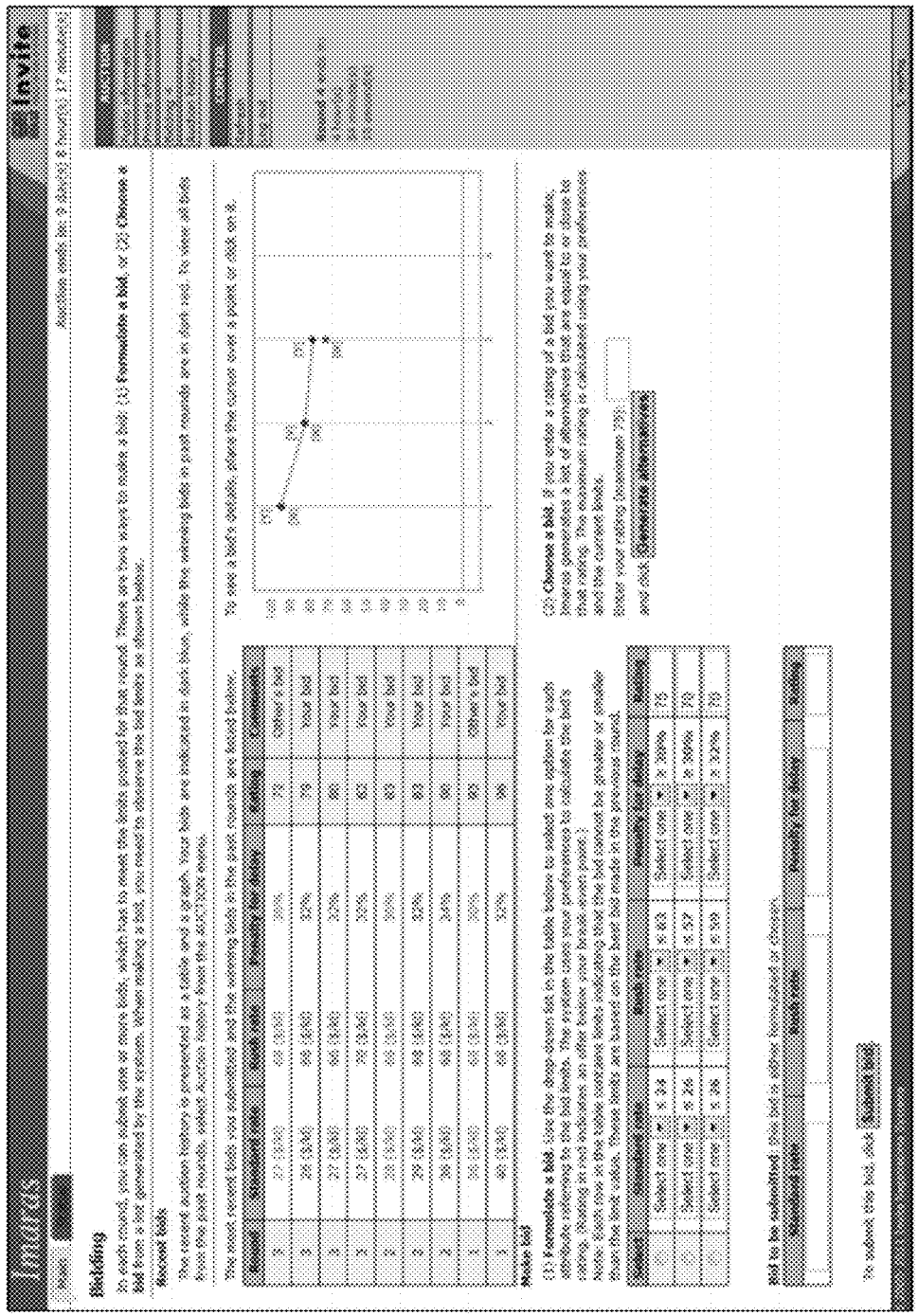
FIG. 4C is an illustration of a user interface of the bidder client device in a semi-synchronous auction and the bidder is not the current winner, according to an embodiment.

Presented in FIG. 4C according to one embodiment of the auction status viewer 320, there is a user interface of the bidder client device in a semi-synchronous auction in which the bidder is not the current winner. Indeed, the rating obtained by the bidder in the last round (i.e. rating: 79%) is not the lowest, the lowest rating being 72%.

Figure 4D:
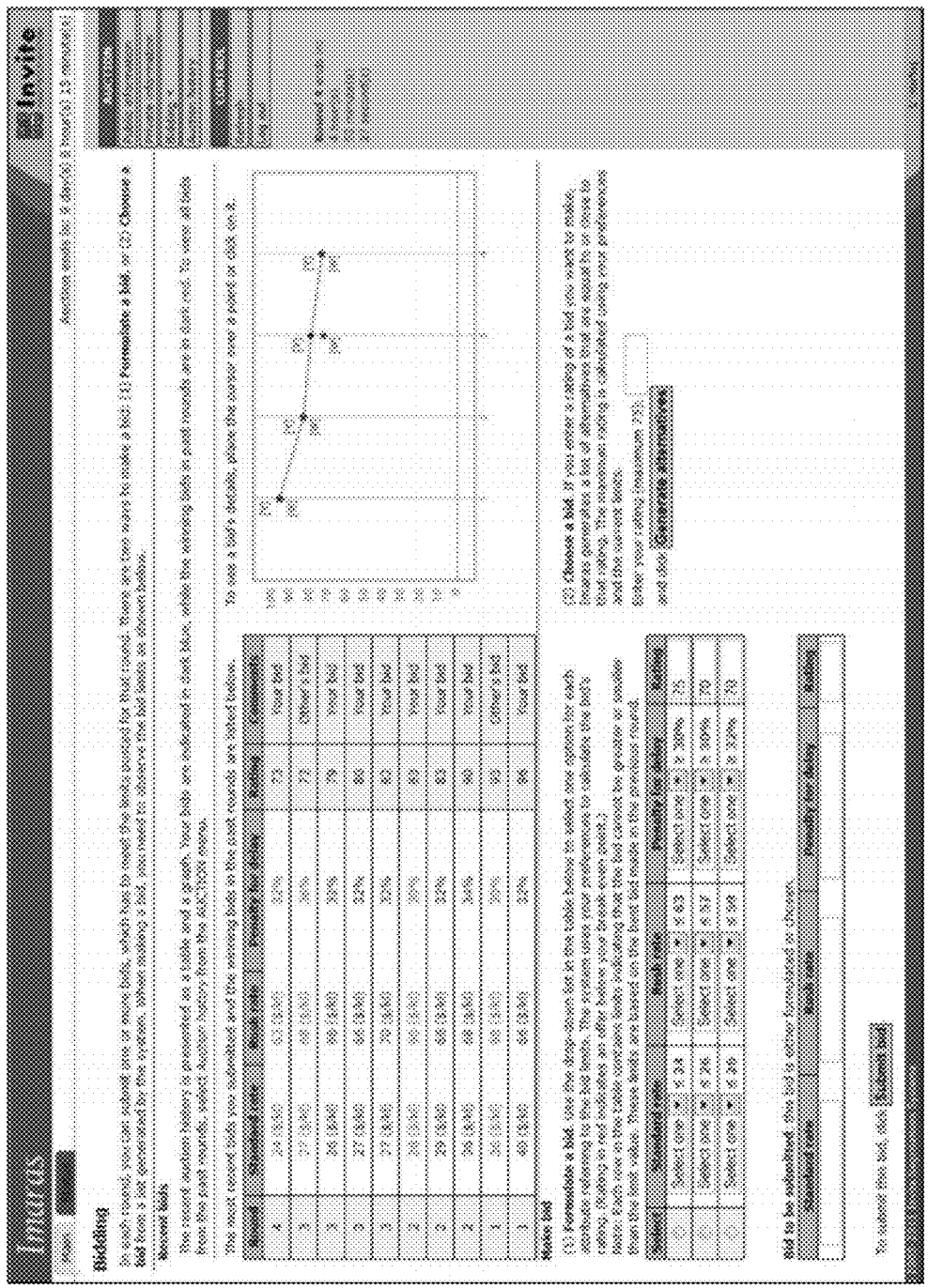
FIG. 4D is an illustration of a user interface of the bidder client device in a semi-synchronous auction and the bidder is the current winner, according to an embodiment.

Presented in FIG. 4D according to one embodiment of the auction status viewer 320, there is a user interface of the bidder client device in a semi-synchronous auction in which the bidder is the current winner. Indeed, the rating obtained by the bidder in the last round (i.e. rating: 73%) is the lowest rating of the round.

Figure 4E:
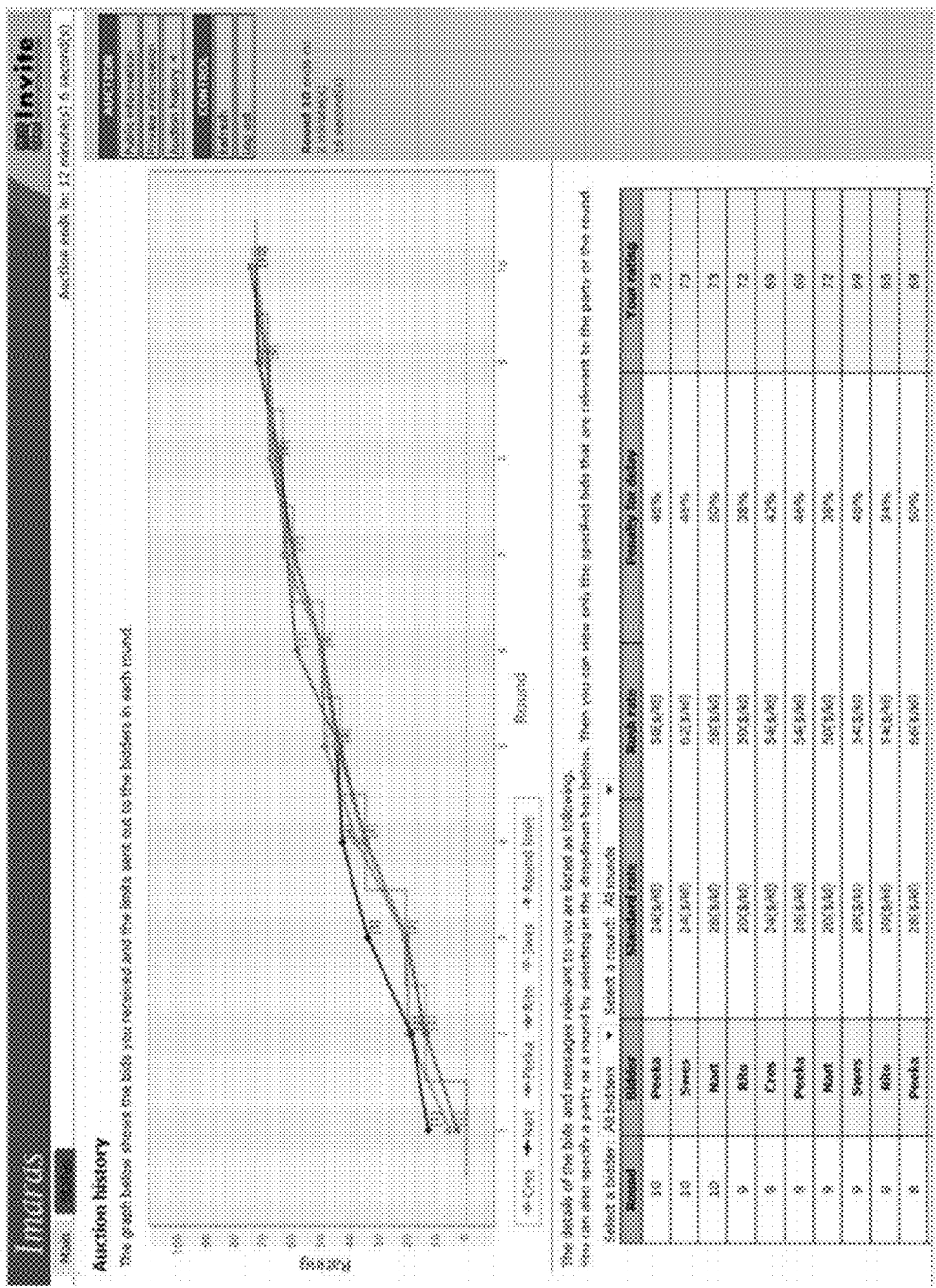
FIG. 4E is an illustration of a user interface of the bid-taker client device, according to an embodiment.

Presented in FIG. 4E according to one embodiment of the auction status viewer 316, there is a user interface of the bid-taker client device (i.e. the auction owner client device). There is a graph the presents the bids the auction owner received and the limits sent out to the bidders in each round. A table listing and detailing the bids of the rounds the auction owner is interested in viewing is presented below the graph.

Figures 9A, 9B:
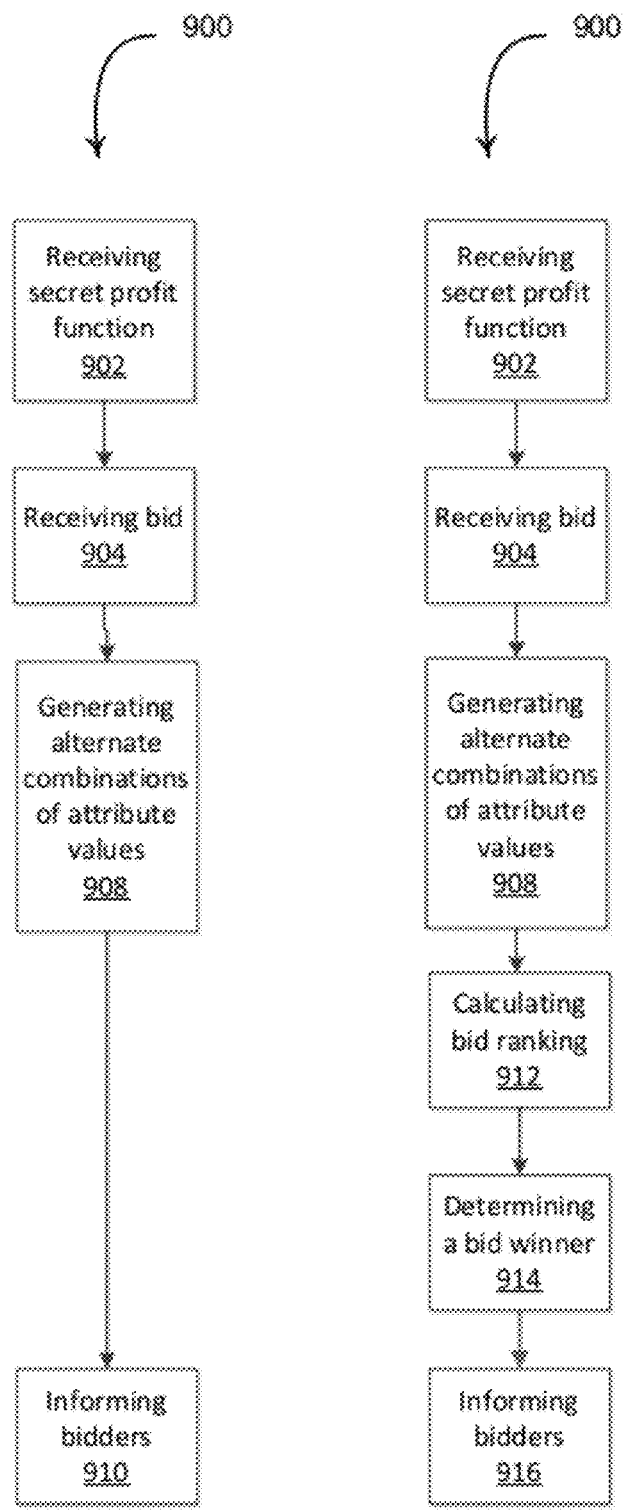
FIG. 9A is a flow diagram illustrating a method of auctioning according to an embodiment.
FIG. 9B is a flow diagram illustrating a method of auctioning wherein a bid winner is determined, according to an embodiment.

According to yet another aspect, as presented in FIG. 9A there is a method 900 for auctioning an auction item in a multi-attribute auction. Bids are iteratively offered to an auction owner by a plurality of bidders. According to one embodiment, the bids are iteratively offered to an auction owner through an auction owner interface of a client computing device 104 by a plurality of bidders through the bidder interface of a client computing device 104.

According to one embodiment of the method 900, to select a winning bid, there is determined a secret value function that is indicative of acceptable combination of attribute values for the auction owner. In the method 900, the auction server 102 receives the secret value function 902 from the auction owner and receives bids 904 from the bidders. The auction server 102 further generates alternate combinations of attribute values 908 based at least in part on the secret value function. For generating the alternate combinations of attribute values at least some of the combinations of attribute values are perturbed so as to prevent or hinder the bidders from deriving or finding the secret value function. The auction server 102 informs the bidders 910, via a bidder interface of a client computing device 104, about the alternate combinations of attribute values. With this information, the bidder can offer a bid in the next round based on the alternate combinations of attribute values, in a progressive manner and without knowledge of the secret value function.

According to one embodiment, the combinations of attribute values are perturbed so as to allow the auction to be progressive. The auction is considered to be progressive when at each round bids progressively move in directions that are increasingly desirable to the auction owner.

According to one embodiment, the combinations of attribute values are perturbed at least in part by applying an increment function to the secret value function.

Presented in FIG. 9B according to one embodiment of the method 900, the auction server 102 calculates a bid ranking 912 for each bid received. The bid ranking is calculated based on the alternate combinations of attribute values and a winning bid is determined 914 based on the bid ranking. Each bidder is then informed about the winning bid 916.

According to one embodiment, a bid winner is selected by comparing the received bids to the secret value function.

Figures 9C, 9D:
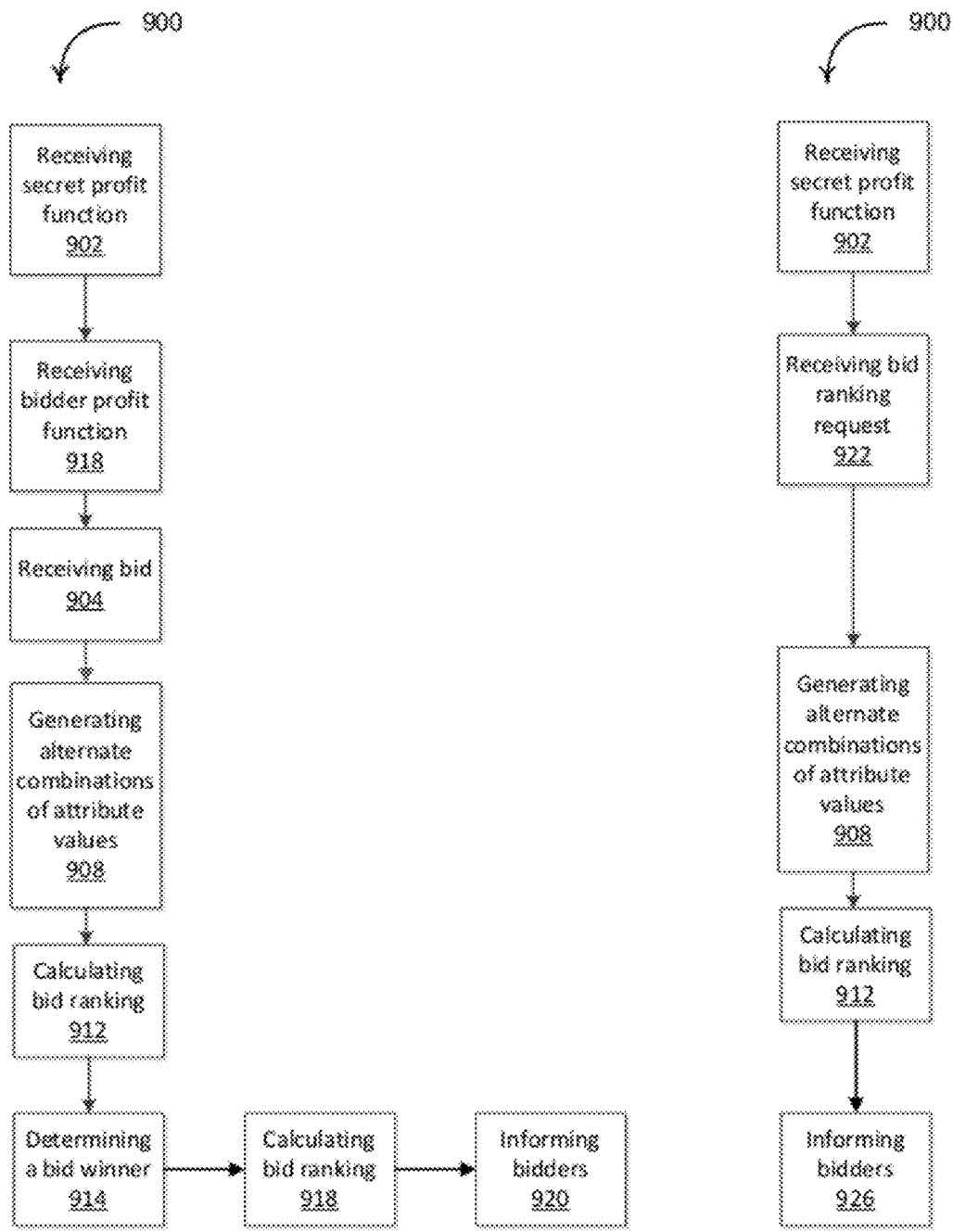
FIG. 9C is a flow diagram illustrating a method of auctioning wherein a bidder profit function is received, according to an embodiment.
FIG. 9D is a flow diagram illustrating a method of auctioning wherein a bid ranking request is received, according to an embodiment.

Presented in FIG. 9C according to one embodiment of the method 900, the auction server 102 receives a bidder value function 918. The bidder value function is indicative of acceptable combinations of attribute values for the bidder. The auction server 102 then calculates a bid ranking of the winning bid based on the bidder value function. The winning bid having been determined 914 according to the secret value function or the alternate combinations of attribute values.

Presented in FIG. 9D according to an embodiment of the method 900, the auction server 102 receives a bid ranking request 922 for a proposed combination of attribute values. The server 102 then calculates a bid ranking 924 for the proposed combination of attribute values based on the alternate combinations of attribute values and sends the calculated bid ranking 926 to the bidder client device 104.

According to one embodiment, the alternate combinations of attribute values are also based on a winning bid of a bidding round and the winning bid is included in the alternate combinations of attributes.

According to another embodiment of the method 900, the auction server 102 maintains or retains the bid for a subsequent bidding round according to the generated alternate combinations.

The following section describes in more detail a reverse auction system according to an embodiment of the present invention.

Reverse Auction

In a reverse auction, according to one embodiment of the present the proposed procedure is controlled by two strategic parameters. These parameters determine the acceptable difference of utility between an accepted inefficient bid and an efficient bid which a bidder could make. Following Bellosta, Kornman et al. (2008, p. 402) we say that the winning bid is efficient when it is a feasible alternative and no seller, except for the winning seller, is willing to provide a bid that is better than the winning bid. Strictly speaking, an efficient alternative takes into consideration the buyer's as well as the bidders' utility functions: "no better bid" means that there is no bid that would yield higher utility for at least one from a pair (buyer, seller) and not worse for any member in the pair. Because bidders' preferences and utilities are not being considered, the term "efficient alternative" describes a bid which maximizes the buyer's utility over all possible bids.

By controlling the value of the strategic parameters the buyer controls: (1) the ability of the bidders to determine her preferences and the possibility of the winning bid to be efficient; and (2) the effectiveness of bidding process determined by the bidders ability to make consecutive bids which are better for the buyer than the earlier bids. A relationship is such that the less likely is for the bidders to discover the buyer's preferences yet be able to bid effectively, the more likely it is that the winning bid is inefficient.

Multiattribute Reverse Auctions

The two key tasks in multiattribute auctions are: (1) representation of the buyer's preferences that allow for the comparison of bids; and (2) specification of the rules for feedback information which the sellers need to receive in order to construct bids.

Preference Representation

There are two main types of preference representation methods (Fishburn, 1976; Dieckmann, Dippold et al., 2009): Compensatory methods, which include additive value functions or more complex utility functions based on multiattribute utility theory (MAUT); and non-compensatory methods, which include attribute lexicographic ordering and the Tchebychev measure.

Compensatory methods are based on the assumption that decision makers' preferences are defined on both attributes and attribute values, and that they can formulate trade-offs between attributes and between attribute values. This assumption allows for the aggregation of preferences into some kind of function which measures the worth of an alternative. The measure is a utility. The term utility covers in this text as well utility functions or value functions as simple ratings. Multi-attribute auction mechanisms have been designed using scoring functions or utility (e.g., Bichler, 2001; Beil and Wein, 2003; Engel and Wellman, 2010). Additive linear functions (i.e., weighted sum) have been implemented in e-sourcing systems offered by B2emarkets.com (now bravosolutions.com) and Perfect Commerce (perfect.com), (both current December 2010).

A specific class of compensatory methods is the use of costing: all attributes and their values are transformed into monetary values. These methods can be used only when the attributes can be priced; examples include A.T. Kearney Procurement & Analytic Solutions (ebreviate.com) and CapGemini IBX (ibxeurope.com), (both current December 2010).

Non-compensatory models have been proposed to evaluate bids at the attribute level but not between the attributes. The two well-known methods are: lexicographic ordering and the Tchebychev function. Lexicographic approaches are simple heuristics in which the attributes are ordered from the most important to the least important. The alternatives are compared first using the most important attribute. If they do not differ on this attribute, then the second most important is used, and so on. These heuristics were found to perform well and sometimes better than a compensatory method (i.e., conjoint analysis) in ranking of alternatives but not in rating them (Dieckmann, Dippold et al., 2009). In their study as well as earlier studies (e.g., Dhar, 1996) the participants were given little time and need to choose from among several alternatives. When participants were given more time and could explore information, as well as when the problem was more complex (i.e., measured by the number of attributes and alternatives) compensatory models outperformed lexicographic strategies (Yee, Dahan et al., 2007). If the number of alternatives is large, then lexicographic models may fail because they do not allow for large difference in values of several attributes of lower importance to outweigh a small difference in the value of a more important attribute.

Bellosta, Kornman et al. (2004) and Brigui-Chtioui and Pinson (2010), proposed the use of Tchebychev distance to represent the buyer's preferences. The non-compensatory character of this distance allowed the authors to suggest feedback based on attribute values. The sellers need not consider tradeoffs, instead their bids have to contain a value greater than the previous best bid on at least one attribute and not worse on any attribute.

Bellosta, Kornman et al. (2008) proposed MERA, a procedure for mechanism design for both synchronous and asynchronous multiattribute reverse auctions in which, in addition to Tchebychev distance, lexicographic ordering and weighted sum function can be incorporated. The framework relies on the notion of reservation levels for which constructing the preference aggregation method is used. According to one embodiment there are determined reservation levels for the auction design and the reservation is transformed from the utility space to the space of alternatives. This has an important and desirable impact on the information feedback.

Feedback Rules

A common concern in multi-attribute auctions pertains to the exchange of additional information relevant to the buyer's preferences.

Several rules have been designed to provide feedback to bidders during auctions, including: complete value function, winning bids (with/without value), and all bids (with/without ranking).

In the framework proposed by Bellosta et al. (2008) the information passed by the owner depends on the way she constructs her representation. When the representation includes a linear additive utility function (i.e., weighted sum), then the owner passes this utility and its lower bound. When the preferences are represented as a lexicographic aggregation model or a Tchebychev function, then the owner passes bounds imposed on the attribute values. This dependency is difficult to reconcile with the requirement that the owner does not make her preference model public (Burmeister, Ihde et al., 2002; Parkes and Kalagnanam, 2005). The owner's inability to keep her preference private may force her to use a different model, which she does not know, agree with, or is inappropriate to the particularities of the problem.

Teich, Wallenius et al. (1999) suggest a feedback rule in which the buyer prescribes a preference path, an ordered set of combinations of prices and non-priced attributes. The preference path begins with an anchor point and the rule specifies that a point further from the anchor is preferred by the owner over the point that is closer to it. This allows the sellers to decrease the worth of their bids (as seen by the buyer) by proposing a combination that is more preferred by the buyer than that combination previously proposed. Burmeister, Ihde at al. (2002) note one drawback of this method which is bidders' restriction in their choices, i.e., they are only allowed to bid on the preference path. Another limitation is the possibility for sellers to use the preference path to construct the buyer's utility function.

The feedback rule described by Bellosta et al. (2008) depends on the preference representation method. For a compensatory method the feedback is the buyer's preference aggregation function. The feedback also includes the minimum scoring value which is the value of the best bid made in the earlier round plus an arbitrary increment. This feedback allows the sellers to determine if they are willing to make bids with scoring value exceeding the minimum. Informing the sellers about the buyer's preferences is the primary limitation this approach. As mentioned above, in many instances buyers' are not willing to provide this information. Therefore, according to an aspect of the present invention, there is a procedure in which the buyer's preferences are not revealed and yet the sellers obtain information which allows them to make progressive bids.

Brigui-Chtioui and Pinson (2010) propose a feedback rule based on the Tchebychev distance from the current best bid, the buyer's aspiration levels and the number of sellers. The rule requires that the aspiration levels are set for every attribute, remain fixed and cannot be exceeded. It also requires the use of non-compensatory preference measurement model function.

Problem Representation

Preliminaries

The proposed procedure for multi-attribute auction has two types of components: (1) the auction owner component, and (2) the bidder component. There is one or more bidders and they may behave according to the same or a different set of rules. In this embodiment, reverse auctions are considered, therefore the owner is the buyer and bidders are sellers. The procedure may, however, be modified to standard auctions in which the owner is the seller and bidders are buyers without departing from the scope of the present invention.

Reverse auction A is a set of collections which describe the owner's (buyer) and all J bidders' (sellers') problem representations:

$$A = \{P_t, I_t, B_{jt}, O_{jt}\}, (t=1, \ldots, T; j=1, \ldots, J) \quad (1)$$

where, for round t (t=1, ..., T):

$P_t$ is the auction owner's (buyer's) problem representation;

$I_t$ is the information (feedback) which the auction owner presents to the bidders;

$B_{jt}$, (j=1, ..., J) is the representation of individual bidder's j decision problem; and $O_{jt}$, (j=1, ..., J) is a bid made by bidder j constructed on the basis of solutions of $B_{jt}$.

If in a round t (in the following index t is omitted unless it is important to indicate rounds) for J=3 the tuple A={P, I, B$_1$, O$_1$, B$_2$, O$_2$, B$_3$, O$_3$} represents ability (I) of owner to communicate the problem to three bidders and their reactions to the information to this message. Problem representations B$_1$, B$_2$ and B$_3$ of every of the three bidders are unknown to the owner and other bidders, and they are not considered in this paper. The bidders' reactions O$_1$, O$_2$ and O$_3$ are known to the bidder. In the sequel there is assumed an elicited additive utility for the owner. The bidders' representation remains uncovered in the analysis.

It is important to allow for the separation of the owner's and the bidders' representations. In particular, two types of separation are required: Owner framing: while I is derived from P, the same information I may be obtained for different representations P, and vice versa; and Bidder separation: irrespectively of the representation B$_j$ bidder j is using, she formulates her bid O$_j$ (j=1, . . . , J), in a manner required by the auction protocol.

The two separations are conceptually similar in that they both state that the information passed by one person (entity) to another does not depend on the way this person formulates and solves her decision problem. The concern here is with the perspective of the buyer and the information that the buyer presents to, and obtains from, the sellers. The sellers are completely independent—they may construct any type of their own problem representation and they may make any offer they wish, providing they do it according to the auction protocol.

Representation of the Buyer's Decision Problem

The buyer's problem representation comprises a set of feasible and acceptable alternatives X and the buyer's utility function u, that is, P={X, u}. There are consider alternatives which are described using N attributes (N≥1). Attributes serve not only to describe alternatives but they also play an important role in their evaluation.

According to the following notation:

$x_j^n$–j-th value of attribute $n$, (j=1, . . . ,J$_n$;n=1, . . . ,N);

$X_n = \{x_j^n; j=1, . . . ,J_n\}$–set of feasible values of attribute j; (j=1, . . . ,J$_n$;n=1, . . . ,N), $x_l = [x_{jl}^n]$–l-th alternative, l=1, . . . ,L;

X–set of feasible alternatives, $X = \{x_l = [x_{jl}^n], l = 1, . . . ,L\}$. (2)

From (2) it follows that set X is assumed to be discrete; it has L=|X|=Π$_{n=1}^N$J$_n$ alternatives and is bounded. The discretization of X is not necessary but it simplifies the process. It also has little practical implications because in most, if not all, auctions bidders cannot bid below the smallest allowable units, be it dollars or cents, meters or grams.

The attributes may be discrete or continuous variables. If they are discrete (e.g., categorical or nominal), then their values are known to auction participants. If they represent a continuous variable (e.g., distance or weight), then we assume that only a discrete subset is considered. The permissible attribute values are those which differ by no more than $\in^n$, which is the smallest meaningful increment of attribute $x^n$ (e.g., a centimeter, gram or dollar).

In order to describe an alternative's evaluation, it is assumed, without loss of generality, that the owner wants all attributes to be achieved at the highest possible levels. Qualitative attributes (e.g., color or mark) have no natural order (e.g., one cannot say what is the increment from attribute value "blue" to value "green". Such attributes can be ordered with a subjective scale, e.g., according to their utility. This means that the auction participants may have very different orderings of a qualitative attribute. The buyer may provide her preferential order or exclude some values of these attributes throughout the auction. To be consistent with our perspective that buyers do not want to disclose their preferences, we choose the latter option.

Consequently, it is assumed that there is the owner's numerical evaluation u:X→R of alternatives from the set X. This evaluation may represent profit, costs, utility or any other economic indicator the owner wants to employ. We also assume that every bid, which can be accepted, is an element of set X. This means that bids O$_j$ introduced in (1) are feasible alternatives x$_l$. The utility of the j-th bidder's offer x$_j$ aggregates utility attribute and then it takes into account values of attributes.

For each attribute n, n=1, . . . , N, let us denote by w$^n$ the weight representing the owner's preference for this attribute. Partial utility $u^n(x_j^n)$ describes the owner's preference regarding j-th value $x_j^n$ (j=1, . . . , J$_n$) of the n-th attribute. It is a product of the attribute and attribute value weights, i.e.:

$$u^n(x_j^n) = w^n v(x_j^n).$$

The utility of an alternative x is the sum of attribute and attribute value weights. We assume that the utility function is additive and monotonic (it may be nonlinear), i.e.:

$$u_l = u_l(x) = \Sigma_{n=1}^N w^n v^n(x_j^n). \quad (3)$$

Useful but not necessary information is about an alternative that yields the highest utility value for the buyer. We call this ideal alternative $x_M \in X$. This means that there is no feasible alternative that yields higher utility. In a similar manner we distinguish the worst alternative $x_1 \in X$ as one that yields the lowest utility value.

Reservation Levels

Auctions literature suggests specification of reservation levels (Milgrom and Weber, 1982; Walley and Fortin, 2005). These are the bounds used to distinguish the acceptable attribute values from the unacceptable ones. The acceptability of an alternative depends on its feasibility and utility. A given utility value is used as a threshold so that alternatives which yield lower utilities are deemed unacceptable and those that meet or exceed the threshold are acceptable.

In single-attribute auctions, bidders are informed about the reservation level (reserve price). Bids that fell below that value are rejected. Because the first bid has to be higher than the reservation level and a subsequent bid has to be higher than the bid it precedes, the initial reservation level need not be revised. Bids play a role of a reservation levels; there are as many changes in the de facto reservation levels as there are bids.

In multiattribute auctions a different approach is needed. According to one embodiment of the present, in one round, the sellers submit bids not knowing about their order. That is, they do not know which bid is the winning bid and whether the buyer prefers their bid over other bids. Before they move to the next round they may be informed about the winning bid. However, the announcement is not sufficient for bidders to be able to propose bids that yield higher owner's utility value than the utility of the winning bid.

According to another embodiment, at the beginning of each round, the bidders need to obtain information about the acceptable bids. This information is contained in the announced (by auction owner), revised reservation levels. The reservation levels thus play a similar role in the proposed procedure as in a single-attribute auction, but they are revised after each round. The purpose of the revisions is to guide the sellers into the subset of X which is acceptable to the owner.

For example, in a single-attribute auction the best bid in round t is $512. This informs the bidders that in round t+1 any bid below $512 is unacceptable and any bid above $512 is acceptable. If there are two attributes—price and delivery time—then information that the best bid in round t was $406 and 35 days does not provide the bidders with sufficient information. If, however, the owner announces that either the price has to be higher than $410 and delivery time 33 days, or that the price has to be higher than $390 and delivery 29 days, then the bidders can make acceptable bids.

Assuming that the auction may be represented as a series of bidding rounds t, (t=1, 2, . . . T), reservation levels are determined at the beginning of rounds. The process of reservation-level revision resembles a single-attribute auction with the difference that here the revised values need to be computed. In a single-attribute auction the most recent bid value becomes de facto a new reservation level and the next bid cannot be below this value. In the multi-attribute case, the levels need to be re-evaluated so that they reflect the buyer's preferences over multiple attributes.

Another difference between single- and multi-attribute auctions is that, in the former case, a single reservation level is sufficient to restrict biddings to all alternatives that the buyer prefers over a particular reservation levels. This is not the case in multi-attribute auctions. The preference is determined by the minimum acceptable utility value which then needs to be transformed into reservation levels set for all attributes.

Set $X_r$ is acceptable with the reservation level r, $r \in R$, for the owner when all its elements meet the reservation level condition, i.e.:

$$X_r = \{x \in X : u(x) \geq r\} = u^{-1}([r, +\infty[), \qquad (4)$$

where r represents the minimum acceptable utility value.

The reservation level r means that every bid which yields lower utility than r is rejected; it is considered to be an infeasible bid. To stress this characteristic, we call $X_r$ r-feasible set and its elements r-feasible alternatives.

It is assumed that the buyer does not want to inform the bidders about the minimum acceptable utility value because this would be tantamount to informing them about her utility function. Therefore, she has to transform the above condition so that it is defined on the attribute rather than on the utility values. That is, the buyer has to transform utility reservation level r to the attribute reservation levels which she can pass to the bidders. It is further assumed (see Section 3.2) that the owner wants all attributes to be achieved at the highest possible levels. Therefore, the attribute reservation levels are lower bounds.

Note that some attributes may be nominal. For these attributes lower bounds are not meaningful. These attributes' values are ordered by the buyer's preferences which are unknown to the bidders. Therefore, it is assumed that the bound, which is defined for nominal attributes, divides their values into acceptable and unacceptable ones. For example, consider color as an attribute with four feasible values (black, grey, red and white). A bound dividing the feasible set may set black and grey as unacceptable and red and white as acceptable. The bidders are told that only bids in which the color is either red or white can be accepted.

Figure 5A:
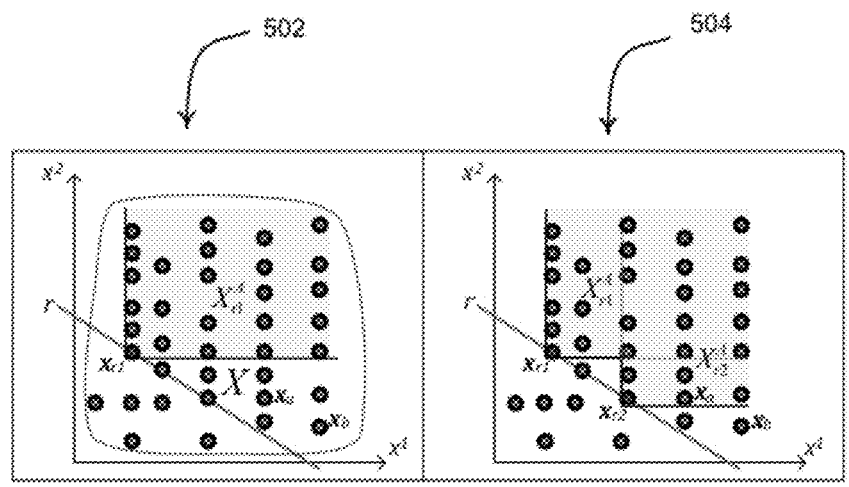
FIG. 5A presents graphs illustrating combinations of attribute values based on a secret value function of the auction owner, according to an embodiment.

To illustrate the construction of the lower bounds based on formula (4), an example is shown in FIG. 5A. The set X of feasible alternatives consists of all points shown in graph 502 and 504. Set $X_r^A$ is the set of all points on and above line r.

Assuming that the reservation level r is determined by alternative $x_r$, that is, $u(x_r) = r$. Alternative $x_r$ is said to be the reference alternative because it is used to construct r-acceptable set $X_r^A$, as follows:

$$X_r^A = \{x \in X : [x^n] \supseteq [x_r^n]\}, \qquad (5)$$

where $\supseteq$ denotes: (i) the relation $\geq$ if $x^n$ is a numerical variable, or (ii) it is another preferential order that divides set $X_n$ of attribute values into acceptable and unacceptable subsets.

This means that $X_r^A$ comprises alternatives with utility values not lower than r. Note that information about $X_r^A$ can be easily conveyed to the bidders. Information about $X_r^A$ is included in I defined in (1). For numerical attributes it is sufficient to include in I the requirement that the attribute value cannot be lower than $x_r^n$. If the attributes are nominal, then/must include either all acceptable attribute values or all unacceptable values.

Information included in I, which describes $X_r^A$, is obtained by transforming the reservation level condition given in (4) from the utility space to the alternative space. To indicate that it is obtained by the process of selection of utility value r and reference alternative $x_r$, this is the r-reservation levels.

Taking into account monotonicity of the owner's utility, the following is obtained:

$$X_r^A \subset X_r. \qquad (6)$$

In the following, it is assumed, for simplicity, that alternative values are numerical. In this case $X_r^A$ comprises points inside the rectangle $(x_r \oplus R_+^N)$.

Design Parameters

The construction of set $X_r^A$ defined in (5) may result in a loss of r-feasible alternatives (i.e., in the case where $X_r - X_r^A$ is non-empty). This means that some r-feasible alternatives are not r-acceptable; their utility value is greater than r but they violate at least one of the attribute reservation levels. This is the consequence of the way the attribute reservation levels are specified rather than the intention of the buyer in placing a restriction on bids.

This situation is illustrated in graph 502 of FIG. 5A. The buyer desires that the bids' utility exceeds utility r. However, by selecting only one point $(x_{r1})$ to decide on the r-reservation levels, she removes several acceptable alternatives where utility is not lower than r. For example, the utility of both $x_a$ and $x_b$ is higher than r but they are not elements of X.

If $x_r$ is a bid, then the solutions of inequality $u(x) \geq r$ define the set $X_r^A$ in (4), which is not empty. In the case where X is a vector-space structure $R^N$, the following hyperplane may be constructed:

$$H_r = \{x \in R^N : r = u(x) = \Sigma_{n=1}^N w^n v^n(x^n)\}.$$

It is observed that $\overline{X}^r = u^{-1}(r) = X \cap H_r$, and not all elements of $\overline{X}_r$ have to be included in the set which the owner presents to the bidders in order to receive bids with utility value not lower than r (see e.g. graph 502 of FIG. 5A) and without revealing her utility. It is shown that if there are r-feasible alternatives which are not r-acceptable, then they can be used to expand the set of r-acceptable bids.

Proposition

The owner can operationally split the set of r-acceptable alternatives into alternatives with attribute values exceeding attribute thresholds defined by a bid with utility r, and the remaining alternatives.

In the case of a finite set the split can be done by enumeration of bids and direct comparison of their attribute using relation $\supseteq$ (5). If this relation is represented by the relation then the condition for a split can be phrased as membership in the set of solutions of an inequality of real numbers constructed using scalar products of vectors spanned by some boundary bids.

Construction of r-Acceptable Sets

The fact that some r-feasible alternatives are not included in r-acceptable set $X_r^A$ may lead to an auction which terminates with an inferior, Pareto-dominated, bid. This is the case when the bidders want to bid only on the excluded alternatives but are unable to do it. Considering again the situation illustrated in graph 502 of FIG. 5A. If no bidder submits a bid that meets r-reservation levels (i.e., is an element of $X_r^A$), then an earlier bid with utility lower than r will be accepted. It is possible, however, that bidders would propose $x_a$, $x_b$, or some other alternative which is r-feasible but not r-acceptable.

The number of r-acceptable sets can be increased by increasing the number of reference alternatives (see (5)).

The case of two reference alternatives is illustrated in graph 504 of FIG. 5A. The introduction of the second reference alternative expands the r-acceptable set, that is:

$$X_{r2}^A = X_{r1}^A \cup X_{r2}^{At} = \{x \in X : x \geq x_{r1}\} \cup \{x \in X : x \geq x_{r2}\}.\quad (7)$$

[1] "≥" denotes that respective inequality holds for each attribute of an alternative.

The addition of set $X_{r2}^{At}$ allowed for the inclusion of alternative $x_a$ in the acceptable set (see graph 504). However, despite this addition alternative $x_b$ remains unacceptable.

By letting $X^\geq(x_0)$ be a set comprising of feasible alternatives such that each attribute value of its elements is no smaller than the corresponding attribute value of $x_0$. That is:

$$X^\geq(x_0) = \{x \in X : x \geq x_0\}.$$

In (7) two reference alternatives are used to expand the r-acceptable set.

In general, D such alternatives may be used. Hence the following is obtained:

$$X_{rD}^A = U_{d=1}^D X_{rD}^A = U_{d=1}^D \{x \in X : x \geq x_{rd}\},\quad (8)$$

where: alternative $x_{rd}$, is d-th reference alternative (d=1, ..., D), such that $U(x_{rd}) \geq r$, and there is at least one reference alternative $x_{rd*}$ for which $U(x_{rd*})=r$. Reference alternative $x_{rd*}$ is the alternative which was used to determine the acceptable value of utility r (see (4)).

Graph 504 illustrates the situation in which both reference alternatives yield the same utility value r. This is not necessary and there may be situations when there is only one such alternative, yet two or more reference alternatives need to be selected. In such case alternatives which utility value is greater but different from r as little as possible, can be selected to generate r-acceptable sets. It is proposed to select alternatives with utility as close to r as possible so that no alternative that is significantly better for the buyer can be removed. Only these alternatives which are marginally better can be removed.

Any choice of the number of reference alternatives influences information $l_t$ which the bidders receive at the beginning of round t (see (1)). An increase of reference alternatives expands the set of r-acceptable alternatives for the next round by alternatives dominated from owner's point of view and it may encourage bidders to submit new offers which otherwise would be excluded.

In each round t information $l_t$ about r-acceptable sets is presented to the bidders. The notation $X_{rD}^{At}$ is used to describe the set of r-acceptable alternatives which is a subset of X formulated for round t and defined by D reference alternatives (t=1, 2, ..., T). To simplify the notation, the r value, number of reference alternatives and/or the round number, are dropped when unnecessary.

It is to be noted that the assumed monotonicity of utility function allows us to use single reference alternative $x_r$ for the construction of the r-acceptable set $X_{r1}^{At}$ for t, (t=1, 2, ..., T). If the utility is non-monotonic and reaches one or more optimum within the set rather than on its boundary, then the acceptable set needs to be defined by more points.

Parameter D, which defines the number of reference alternatives used to construct the r-acceptable set, is one of the mechanism design parameters. The buyer needs to determine its value and this requires taking into account the following two types of tradeoffs: The first tradeoff is the relationship between the number of alternatives which are r-feasible but not included in r-acceptable set $X_D^{At}$ and the bidders' difficulty in selecting bids from this set. The greater the value of D, the fewer acceptable alternatives are not included but the number of sets in which the bidders need to consider increases making bidding more difficult.

The second tradeoff is the relationship between the number of alternatives D used to specify $X_D^{At}$ and the bidders' ability to discover the buyer's utility function. The greater the value of D, the fewer acceptable alternatives are not included but it is easier to determine the analytical form of the utility.

The second type of tradeoff should be addressed because D may be greater than the minimum number of alternatives required to determine the owner's utility function $N^u$. In the example shown in FIG. 1(*b*) the selection of two reference alternatives would allow the bidders to determine the buyer's utility function. Reduction of the number of reference alternatives from two to one leads to the situation described in graph 502, in which many acceptable alternatives are excluded. However, even in the case of two reference alternatives (graph 504) there may be many r-feasible alternatives excluded.

Perturbation of r-Acceptable Set

Design parameter D is used to control the construction of such an r-acceptable set, that excluded r-feasible alternatives are not sufficiently relevant for the buyer. The buyer knows that some alternatives are excluded but they do not differ much from some of the alternatives which are then included.

Figure 5B:
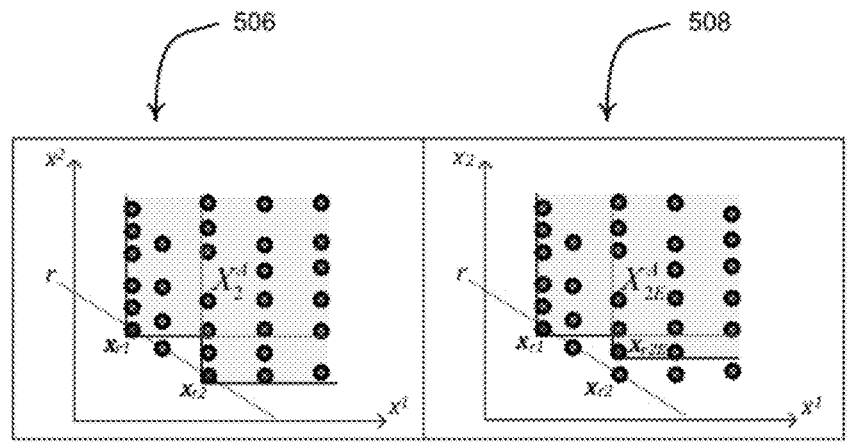
FIG. 5B presents graphs illustrating a perturbation to the combinations of attribute values, according to an embodiment.

An increase of the value of D expands the set but, as the second tradeoff mentioned above states, it does so at the cost of increasing the possibility of preference disclosure. In general, it is not possible to avoid indirect disclosure of the owner's preferences and keep all r-feasible alternatives in the r-acceptable set (i.e., these that yield equal or higher utility than the winning bid). If, however, the owner accepts that some r-feasible alternatives are excluded, then a disclosure can be avoided by making a small change in some of the reference alternatives. This situation is illustrated in FIG. 5B.

To address the issue of the discovery of the buyer's utility function, a deviation from the reference alternatives may be introduced. An example of this intervention is presented as the transformation of set $X_2^A$ shown in graph 506 to set $X_{2E}^A$ shown in graph 508 of FIG. 5B. The intervention is the replacement of the reference alternatives. In this example, alternative $x_{r2}$ is replaced with $x_{r2E}$. The result of this perturbation may be a loss of some of the r-feasible alternatives but the bidders' ability of discovering the buyer's utility is diminished. In effect this is the third type of tradeoff: the relationship between the deviation size which is associated with the number of removed acceptable alternatives and the difficulty in discovering the buyer's utility function. The greater the deviation, the greater the difficulty but this comes at the expense of an increase in the number of acceptable alternatives removed which may lead to the loss of efficient bids.

Parameter E is used to control the deviation. This parameter has two parts, i.e., $E=\{e, n^E\}$, where e is a vector of attribute increments ($e=[e_1, \ldots, e_N]$); and $n^E$ is the number of attributes values which are changed. (If the value of only one attribute at the time is changed, then $n^E=1$).

E represents the second mechanism design parameter. It reflects the buyer's willingness to accept a winning bid that is not Pareto-optimal in X. Its values need to be decided externally to the procedure. In many cases the values of the elements of e may be the minimal attribute increments which are meaningful for the participants.

Design parameter E may be applied in a number of ways. Perturbation may involve every reference alternative or only some of them. It is proposed to first consider the number $N^u$ of alternatives that is sufficient to uniquely determine the utility function. If $D<N^u$, then perturbation is not necessary, albeit it may be performed. If $D \geq N^u$, then there are more alternatives yield utility equal r than it is necessary to determine the utility's analytical form. In general, it is possible that D alternatives do not uniquely determine utility function. To simplify the discussion, without verifying if this is the case, it is assumed that at most $N^u-1$ alternatives can yield the same utility. Hence, the minimum number of alternatives that need be perturbed is $D-N^u+1$. The perturbation involves an increase in the value of one or more attributes in each of the selected reference alternatives. The chosen attributes should be different and their selection should be such that the utility of thus constructed reference alternatives differs as little as possible from the winning bid's utility.

The application of parameter E allows replacing set of r-acceptable alternatives $X_D^{At}$ with the subset $X_{DE}^{At}$, i.e., $$X_{DE}^{At} \subset X_D^{At}. \qquad (9)$$

To indicate that $X_{DE}^{At}$ is a subset of r-acceptable set obtained by the application of parameter E, it is considered that its elements are $r_E$-acceptable alternatives.

The two design parameters D and E operate in opposite ways. Parameter D is used to expand the r-acceptable set so that none or a few r-feasible alternatives are excluded. Parameter E contracts the r-acceptable set so that the bidders cannot determine the buyer's utility through fitting a curve to the reference points $x_{rd}$ (d=1, . . . , D).

Process

In this section multiattribute reverse auction mechanism is proposed. The construction of r-feasible and r-acceptable sets is at its core.

Preliminaries

During the auction, the construction of these sets relies on reference alternative $x_r$, which utility is r, (i.e., $u(x_r)=r$). Before the auction begins the first r-acceptable $X_{DE}^{A0}$ set is constructed and presented to the bidders. There may be different ways to construct this set. For example, the owner may use the initial reservation levels as a reference for bidders or propose the feasible set X.

Figure 6:
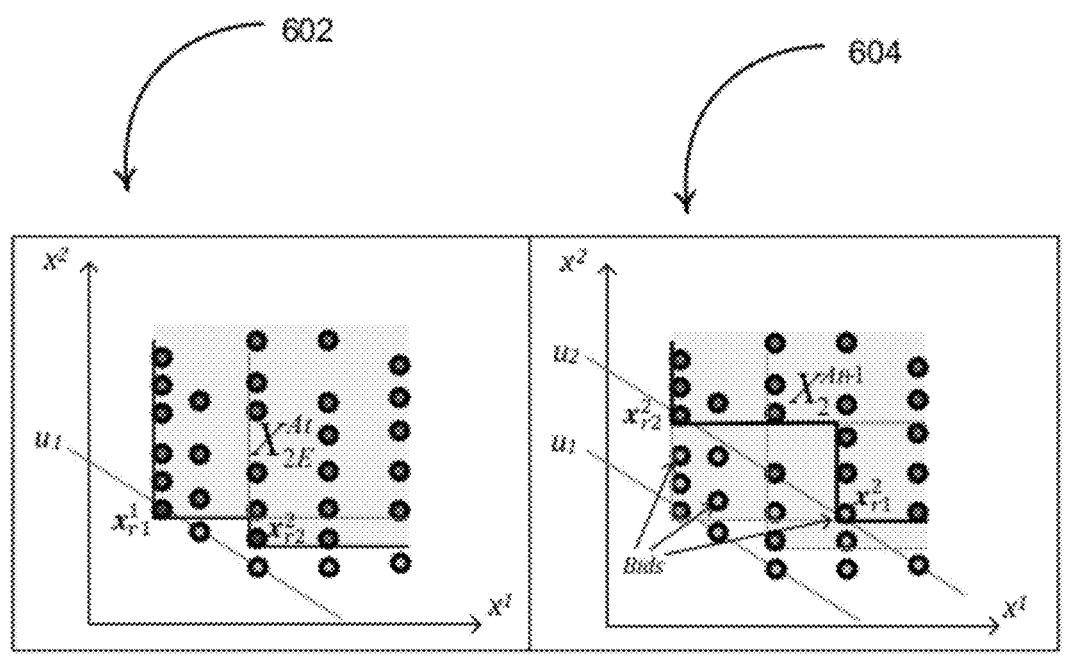
FIG. 6 presents graphs illustrating an alternate combination of attribute values for multiple bidding rounds based on the perturbation to the combinations of attribute values, according to an embodiment.

Graph 602 of FIG. 6 illustrates the auction at the beginning of round t. It is the continuation of the situation shown in Graph 508 of FIG. 5B in which r-acceptable $X_2^{At}$ set was perturbed to obtain set $X_{2E}^{At}$. Set $X_{2E}^{At}$ is defined by two alternatives $x_{r1}$ and $x_{r2}$. In round t three bids are made. These are shown in graph 604 of FIG. 6.

Among the three bids, bid $x_{r1}^2$, yields the highest utility value $u_2$. Therefore $u_2$ and $x_{r1}^2$ are used to determine the r-acceptable set for round t+1. Because D=2, an additional alternative $x_{r2}^2$ is selected. The set $X_2^{At+1}$ defined by these two alternatives is shown in graph 604 of FIG. 6.

The two design parameters D and E have a critical role in the mechanism and its convergence. Their values may be constant or changed during the auction according to a predefined formula. In each case, the values which are used in round t need to be verified for their feasibility.

The reason for the verification of D is that there may be no alternative which can be used as a reference alternative given by (5). That is, after d=1, . . . , $d_1$ alternatives were selected, there may be no alternatives $x_{rd}$, (d=$d_1$+1, . . . , D), such that the following two conditions are met:

(i) $u(x_{rd}) \geq r$ (ii) $x_{rd} \notin \cup_{d=1}^{d_1} X_{rd}^A$ \qquad (10)

Condition (i) above is a part of the construction of the r-feasible set.

Condition (ii) needs to be met because set $X_{ra}^A$ should be introduced only if it contains at least one alternative which is not a member of set $X_{rb}^A$, ($1 \leq b<a \leq D$). Therefore, if a reference alternative $x_{ra}$ is selected, which is already an element of r-feasible set $X_{rb}^A$, ($1 \leq b<a \leq D$), then $X_{ra}^A \subset X_{rb}^A$. This means that set $X_{ra}^A$ is redundant and should not be constructed.

The value of the deviation parameter e=[$e_1$, . . . , $e_N$] may also need to be verified when its elements are greater than the smallest allowable increments. If the value of one or more components is greater, then its application may result in the modification of set $X_{rd}^A$ to set $X_{rdE}^A$ which removes all r-acceptable alternatives so that $X_{rdE}^A$ is empty.

Note that the value of parameter $e_n$ may depend on the characteristics of an attribute. For example, the value will be different for attribute describing price, warranty and delivery time. In such situations $e^n$ is denoted as the deviation control parameter of attribute n, (n=1, . . . , N). If an attributes is nominal, then it cannot have a deviation parameter, that is, there is no $e_j$ for nominal parameter j, $1 \leq j \leq N$). In such situations perturbation means that the attribute value which yields the smallest increase of utility is selected.

The last component of the perturbation parameter E is $n^E$ the number of attributes values, which values are perturbed. There may be a situation when this parameter has to be modified during the auction. If, for example, the utility function is non-monotonic, then there may be different number of points ($N^u$) needed to determine it in one subset of X and different another subset. This could lead to the changes of the attributes that need to be perturbed. These situations are not likely to occur in practice due to the requirements imposed on the buyer in the preference elicitation process. Therefore, it is assumed that $n^E$ is constant throughout the auction.

Given the above caveats, it can be assumed that the values of the two parameters are held constant and that they need not be changed during the auction. To stress the procedure's reliance on the two parameters and the assumption that their values are held constant, the procedure $\mathbb{P}_{DE}$ is denoted.

Procedure

Procedure $\mathbb{P}_{DE}$ comprises the following steps:

Determine value D and, if it is required, the number of rounds T. If, for each attribute, deviation values e=[$e_1$, . . . , $e_N$] are different from the smallest meaningful increment of attribute $\in^n$, then determine values of the components of vector e.

Determine the number $N^u$ of points sufficient to define utility function u and the value $n^E$ of the number of perturbed attributes.

Set t=1. Construct and present initial acceptable set $X_{DE}^{A1}$ to the bidders. Request bids.

Terminate if: either there is at most one acceptable bid received or t=T. Otherwise select the best bid $x^{t*}$ made in round t.

Set t=t+1. Let $u(x_r^{t-1*})=r^t$.

Determine the number $N^{tr}$ of alternatives yielding utility $r^t$. Select a. If $N^{tr} \geq D$, i.e., there are more alternatives yielding utility $r^t$ than is required by the design parameter D, i.e., then select D alternatives $x_d$, such that, $u(x_d)=r^t$, d=1, . . . , D. Go to Step 8.

b. If $N^{tr} < D$, there are fewer alternatives, then select $N^{tr}$ reference alternatives $x_d$, (d=1, . . . ), such that, $u(x_d)=r^t$.

The value of the design parameter D being greater than $N^{tr}$ requires the selection of $D-N^{tr}$ alternatives with utility as close to r as possible, but not smaller than $r^t$.

Use formula (7) to construct set $X_D^{At}$.

Let $\delta=\min(D, N^{tr})$; $\delta$ is the number of alternatives which yield utility $r^t$.

c. If $\delta < N^u$, then perturbation is not necessary. Set $X_{DE}^{At}=X_D^{At}$ and go to Step 11.

d. If $\delta \geq N_u$, then go to Step 10.

Strictly speaking an additional test may be required. There may be $N^u$ alternatives which utility is the same and higher than $r^t$. This may take place when D is large and $N^u$ small. In such situations perturbation described in Step 10 must be repeated for every subset containing $N^u$ reference alternatives with the same utility.

Construct set $X_{DE}^{At}$. The number of alternatives which need to be perturbed is $D^E=\delta-N^u+1$. Select reference alternative $x_d$ such that $u(x_d)=r^t$, d=1, . . . , $D^E$. For each selected alternative choose $n^E$ attributes and increase their values by $e_n$ (n=1, . . . , N).

There are different ways to implement perturbation. For example, one may begin with changing the value of the attribute which yields the smallest utility increase. Note that we assume that the buyer wants as high attribute values as possible. If she prefer smaller values over greater, then in the perturbation the attribute value needs to be decreased Present set $X_{DE}^{At}$ to the bidders and request bids. Go to Step 4.

Efficiency

The efficient alternatives were described above. Correspondingly, the auction mechanism efficiency in terms of the existence of efficient alternatives will be described. Hence, a mechanism is efficient if its rules do not remove any efficient alternative. For procedure $P_{DE}$ this means every efficient alternative which is an element in X is also an element in sets $X_{DE}^{At}$, t=1, . . . , T.

One of the roles of parameters, D and E, is to control the degree of procedure $P_{DE}$ inefficiency, which is the difference between the winning bid and the utility value of an efficient alternative.

From (7) it follows that $X \supset X_D^{At}$, t=1, . . . , T. Beginning with the initial r-acceptable set $X_{DE}^{A0}$ and using (9) repetitively there is obtained decreasing family $X_{DE}^{At}$, t=1, . . . , T:

$$X \supset X_{DE}^{A0} \supset \ldots \supset X_{DE}^{AT-1} \supset X_{DE}^{AT}. \quad (11)$$

Proposition:

Formula (11) states that procedure $P_{DE}$ reduces the number of alternatives which the bidders need to consider. Using (3), (4) and (6) a sufficient condition for $X_{DE}^{AT}$, (given by (11)), can be formulated to include efficient solution, which is:

$$u_0 < u_1 < \ldots < u_{T1-1} < u_T \quad (12)$$

where $u_t = u(u_r^{t*})$, $x_r^{t*}$ is the best bid made in round t.

The proof is straightforward—the two-dimensional version is demonstrated in the graphs 506 and 508 of FIG. 5B.

Theorem 1:

If parameter D, defined above, satisfies inequality $$\forall x \in X_{DE}^{At}: u(x) \geq u_t(x), \quad (13)$$

and there is $$X_{DE}^{At} = X_{DE}^{At-1} \setminus \{x: u(x) < u(x^{t*})\} \neq \emptyset, t=1, \ldots, T, \quad (14)$$

then procedure $P_{DE}$ does not remove any efficient alternative.

Proof:

The proof results from a contradiction: An efficient alternative is one which utility is not smaller than $u(x^{t*})$. If such an alternative is removed so that it is not an element of $X_{DE}^{At}$, then formula (13) for the construction of $X_{DE}^{At}$ is not satisfied. If (14) is obeyed, then only alternatives which are worse for the buyer than the best bid $x^{t*}$ are excluded.

Formula (12) assures that during the construction of r-acceptable set $X_{DE}^{At}$ no acceptable alternative (i.e., one which meets the utility condition (4)) is removed. Condition (13) assures that only alternatives which utility is lower than the best bid utility may be removed when r-acceptable sets are constructed.

Definition:

Bid x* made in round T is winning if:

$$X_{DE}^{AT+1} = \emptyset; \text{ and}$$

$$u(x^*) = u(x_{j*}) \geq u(x_j), j=1, \ldots, J_T.$$

Assuming that there is at least one bid in the auction governed by the process described by Theorem 1, then this process is convergent.

Discussion

The design parameters D and E contribute to the process complexity and efficiency as well as the possibility of the sellers discovering the buyer's utility. If D is large, the process is complex because the buyer conveys information about many r-acceptable sets and the process efficiency decreases. If E is large, then the efficiency increases and fewer rounds are required but the possibility of removing efficient alternatives from the r-acceptable sets increases.

In general, there is no process in which: (1) no efficient alternative is removed; and (2) the sellers are unable to determine the buyer's utility. In this section we propose two procedural tactics which can be implemented for monotonic utility functions.

Distance-Minimizing Strategy

Utility theory posits that the buyer is not interested in the particularities of an alternative but in the alternative's utility value. The buyer may, however, be interested in the efficiency of the process. The efficiency may be increased if the procedure directs the bidders towards the shortest path from any given point to the ideal alternative $x_M$.

Figure 7:
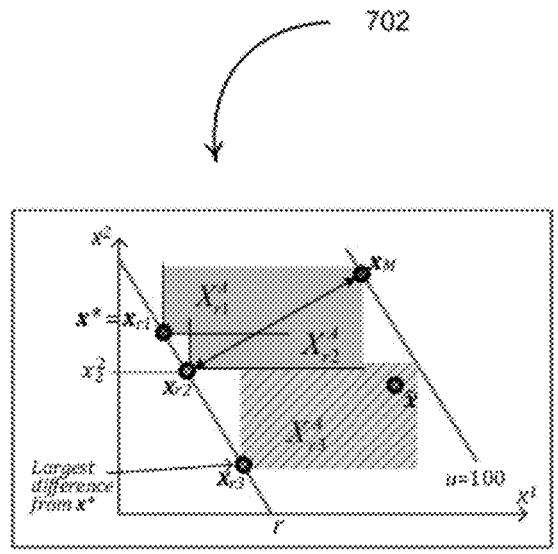
FIG. 7 presents a graph illustrating the alternate combination of attribute values at a bidding round based on a best bid in a previous bidding round, according to an embodiment.

Graph 702 of FIG. 7 illustrates the case when the best bid $x^{t*}$ was made in round t. According to (12), the utility reservation level in round t+1 becomes $u_{t+1}=u(x^{t*})$.

The distance-minimizing strategy means that an alternative where utility is $u_{t+1}$ and which is the closest to $x_M$ becomes the reservation point $x_{r1}$ used to construct r-acceptable set $X_{r1}^A$. The buyer may wish to reduce the number of acceptable alternatives that are not included in this set and add the winning bid thus constructing set $X_{r1}^A$ as illustrated in graph 702.

Structurally Different Alternatives

There are situations when a buyer's preferences are strongly non-uniform. Some attributes are much more important to the buyer than others. In a two-dimensional space, this situation is illustrated in graph 702 of FIG. 7; the angles of utility isoquants are significantly different so that $x^1$ is approximately twice as important as $x^2$.

The best bid ($x^*$) may be relatively close to the ideal point so that there are many alternatives not included in the set $X_r^A = X_{r1}^A \cup X_{r2}^A$. This is shown in graph 702. Limiting the bids to the union of sets $X_{r1}^A$ and $X_{r2}^A$ may result in removing a large part of the r-feasible alternatives (i.e., all alternatives yielding utility not lower than r). This may lead to a loss of efficient alternatives when, for example, there is a seller who bid $\hat{x}$, and no other seller made a bid yielding more than $u(\hat{x})$.

In order to avoid this situation, it is proposed to use alternatives where utility is equal or close to r but where they are significantly different from the best bid $x^*$. To determine the structural difference between elements it is first defined the difference between two values of the same attribute n (n=1, ..., N). Let $x_p$ and $x_s$ be two alternatives in which n-th attribute takes values $x_p^n$ and $x_s^n$, respectively. The difference between values $x_p^n$ and $x_s^n$ is a natural number $i_{ps}^n$, which is the number of minimum increments $\in^n$ of attribute n. For example if the attribute's minimum increment is 2 and the two values of this attribute are 4 and 14, then the difference between them is 5 (14=4+2*5).

Note: For qualitative attributes and also attributes which increment value is not fixed, it is needed to calculate the number of intermediate attribute values. In the case of qualitative attributes the intermediate values are obtained through the ordering of attribute values according to their utility value (see formula (3)).

Definition: The difference $\delta$ between two alternatives $x_p$ and $x_s$ is the sum of absolute differences between the alternative's attribute values measured by the number of the intermediary values:

$$\delta_{p,s} = \sum_{n=1}^{N} |i_{p,s}^n|. \tag{16}$$

The tactic proposed to avoid a situation in which many r-feasible alternatives are not included in r-acceptable sets (graph 702) is based on the selection of a feasible alternative which is the most different from the winning bid $x^*$. That is, alternative $x_p$ is sought for which its distance from $x^*$ is $\delta^*$, where:

$$\delta^* = \max_{\{l: u(x_l) = u(x^*)\}} \delta_{*,l}. \tag{17}$$

Note: If there are no alternatives yielding utility r, then alternatives in the neighborhood providing that they are r-feasible may be searched.

In the example illustrated in graph 702, the largest difference computed with (17) corresponds to point $x_{r3}$.

Auction Rounds and Closure

Auctions which have T rounds are considered. An auction may end in a failure if there was no bid in the first round (t=1). If T is known from the outset, then an auction may end earlier, when no more than one bid was made in round t, t<T.

The buyer may want to control the process and decide about the minimum utility value increment. The increment $\Delta u_{t+1} = u_{t+1} - u_t$, defined by (12), is sufficiently small so that no acceptable alternative that could be a winning bid is removed. If the buyer increases the minimum increment, then the process' efficiency may increase and fewer rounds are required. The downside of such increment change is that the winning bid may be inefficient. This means that minimum utility increment, denoted as $\Delta_u$, constitutes a process-defining parameter.

Figure 8:
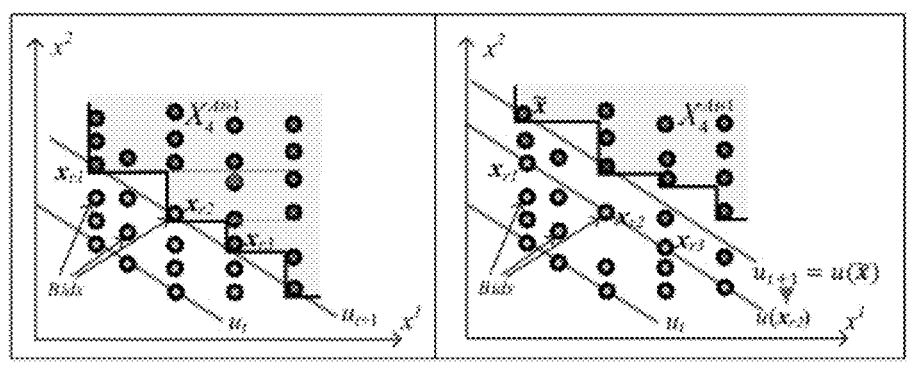
FIG. 8 presents a graph illustrating the alternate combinations of attribute values in a plurality of bidding rounds, according to an embodiment.

The graphs of FIG. 8 illustrate the move from round t to round t+1. In Graph 802 the new minimum increment ($u_{t+1} - u_t$) does not remove any efficient alternative. Bid $x_{r2}$ made in round t, is an element of the r-acceptable set and only alter- natives which this bid dominates are removed. This process follows formulae (13) and (14).

Considering the situation when the minimum utility increment is greater than $\Delta u_{t+1}$ defined by (12). The reason for setting a higher increment may be the buyer's need to get the best bid by the self- or externally-imposed deadline or within a given number of rounds. In the case of a fixed length auction the minimum increment may be defined by:

$$\Delta_u = (u(x^M) - u_0)/T \tag{18}$$

where: $u_0$–the minimum acceptable utility value (used to construct the initial set $X_{DE}^{A0}$ described in Step 3 of procedure $P_{DE}$).

Actual bids are not taken into account in (18), making it not useful when, for example, the best bid utility in one round significantly exceeds the increment required in the next round.

Increment may also be a function which initially it takes a large value which with each subsequent round decreases (e.g. exponential Brigui-Chtioui and Pinson, 2010). Because the bidders are likely to make bids that exceed the utility reservation value, an adaptive rule which is a generalization of (18) can be used:

$$\Delta_{ut} = \max\{\Delta_u; (u(x^M) - u(x^{t*}))/(T - t + 1), \tag{19}$$

where: $x^{t*}$–the best bid obtained in round t, t=1, ..., T+1.

Taking into account utility of bids' allows using the minimum utility increment only when it is necessary. Formula (18) does not require changing procedure $P_{DE}$, (see Section 4.2) as long as the biding process progresses according to the buyer's expectations, that is the best bid utility exceeds minimum utility increment, that is:

$$u(x^{t*}) \geq u_t + \Delta_{ut}, t=1, \ldots, T-1. \tag{20}$$

If, however, the best bid utility is lower, that is inequality (20) does not held, then the minimum increment $\Delta_{ut}$ is introduced. Because the utility of bid $x^{t*}$ is lower than required $u_t + \Delta_{ut}$ another reference point has to be introduced. Let $\tilde{x}^t \in X_{DE}^{At}$ be the reference point replacing $x^{t*}$. Following this replacement, Step 5 in $P_{DE}$, is modified as follows:

Step 5 (revised). Select the best bid $x^{t*}$ made in this round and apply (18). If $\Delta_u < \Delta_{ut}$, then go to Step 6, otherwise replace $x^{t*}$ with $\tilde{x}^t$ and set: $r = \tilde{x}^t$. The situation in which (20) does not held is shown in graph 804 of FIG. 8. In round t, the best bid is $x_{r2}$ but $u(x_{r2}) < u_t + \Delta_{ut} = u_{t+1}$. Alternative $\tilde{x}$ with utility equal to $u_{t+1}$. Additional reference points are selected and set $X_4^{t+1}$ is constructed. In the situation when there are no more bids, $x_{r2}$ becomes the winning bid. This bid, however, may be inefficient because we cannot exclude the possibility the bidders could make a bid that yields utility higher for the owner than $x_{r2}$ and lower than $\tilde{x}$. The bidders could choose one of the alternatives shown in blue that dominate $x_{r2}$, but they were unable to do so by the set of constraints they had to obey.

Extension: Multiple-Categories of Bidders

The proposed procedure allows for the distinction among bidders when the following two conditions are met: (1) The bid-taker can partition all suppliers into exclusive groups comprising suppliers with the same or very similar characteristics so there are no differences among suppliers from the same group; and (2) The bid-taker can measure the differences between each supplier group in terms of the utility; the bid-taker is indifferent between members coming from different groups if the bid utility from a less desirable member is greater than the bid from a more desirable member.

Let C denote the number of groups; c=1, ..., C and let's assume that the lower the group index the lower the utility assigned to this group. That is, the members from group h are less desirable than the members from group c+1.

Let $w_1, \ldots, w_C$ ($w_c > w_{c+1}$) be the utility values required for making tradeoffs between bidders. Condition (2) states that the desirability can be measured with utility, so that bidders $S_c$ (from group c) and $S_{c+1}$ (from group c+1) are equally desirable if the utility of the bid made by $B_c$ is equal to the utility of $S_{c+1}$ bid adjusted by $w_c$.

In the procedure with C different types of bidders, the process of the limit-set construction is divided into H sub-processes. In each sub-process, the steps are essentially the same; the only difference is in the computation of the utility value of the best bid in round t, (t=2, ..., T). For a uniform group of bidders the utility value that is used as the basis for the limit-set construction is the actual bid utility, i.e. $u^*_t = u(x^*_t)$.

If there are C types of bidders, we need to construct C×K of limit-sets. Instead of the above formula, we use the following formula: $u^*_{th^*} = u(\xi_{th^*}) = \max_{h=1, \ldots, c} \{u(x_{tC})/w_c\}$, where $\xi_{th^*}$ is the bid yielding the highest utility value after the adjustment made that account for the group differences.

If the coefficients $w_c$ (c=1, ..., C) are normalized so that $w_C = 1$, then the less desirable sellers have to make better bids in order to be considered as good as the bids made by the more desirable sellers (i.e., $u_c < 1$, $c < C$).

Illustration for a Homogenous Category of Bidders

The following illustrates the proposed reverse auction procedure with the example used by (Bellosta, Kornman et al., 2008, p. 403).

EXAMPLE

Consider a buyer who wants to purchase a car. There are three attributes (N=3) that she is interested in: trademark, warranty, and price. Trademark is a nominal attribute. Warranty and price are numerical attributes; the minimum increment for guarantee is one month and for price it is $10.

The attributes and their values (ranges) are shown in table of FIG. 14A. In the table weights for each attribute and weights for the nominal values of the trademark and the extreme values of the numerical attributes are also given Partial utilities of the two numerical attributes are respectively defined by the following linear functions:

Partial utility of Warranty: $w_i^2 = 100 x_i^2/60$; and

Partial utility of Price:

$$w_i^3 = \frac{100(50,000 - x_i^3)}{50,000 - 10,000}.$$

Using the partial utility functions for two attributes and the information given in table of FIG. 14A we can calculate partial utilities. The utility calculation for two alternatives: $x_1 = $[Reno; 36; 40,400] and $x_2 = $[Pejo; 24; 30,800] is shown in table of FIG. 14B.

The buyer prefers $x_1$ over $x_2$ because $u(x_1) = 48 > u(x_2) = 44$.

The buyer decides to initiate a reverse auction; its process is described in the next section.

Auction

In this section there is illustrated the reverse auction procedure.

Preparation

The buyer formulates the following initial reservation levels:

Every trademark except for "Star" is acceptable;
The minimum warranty period is 12 months;
The maximum price is $50,000.

Figure 10:
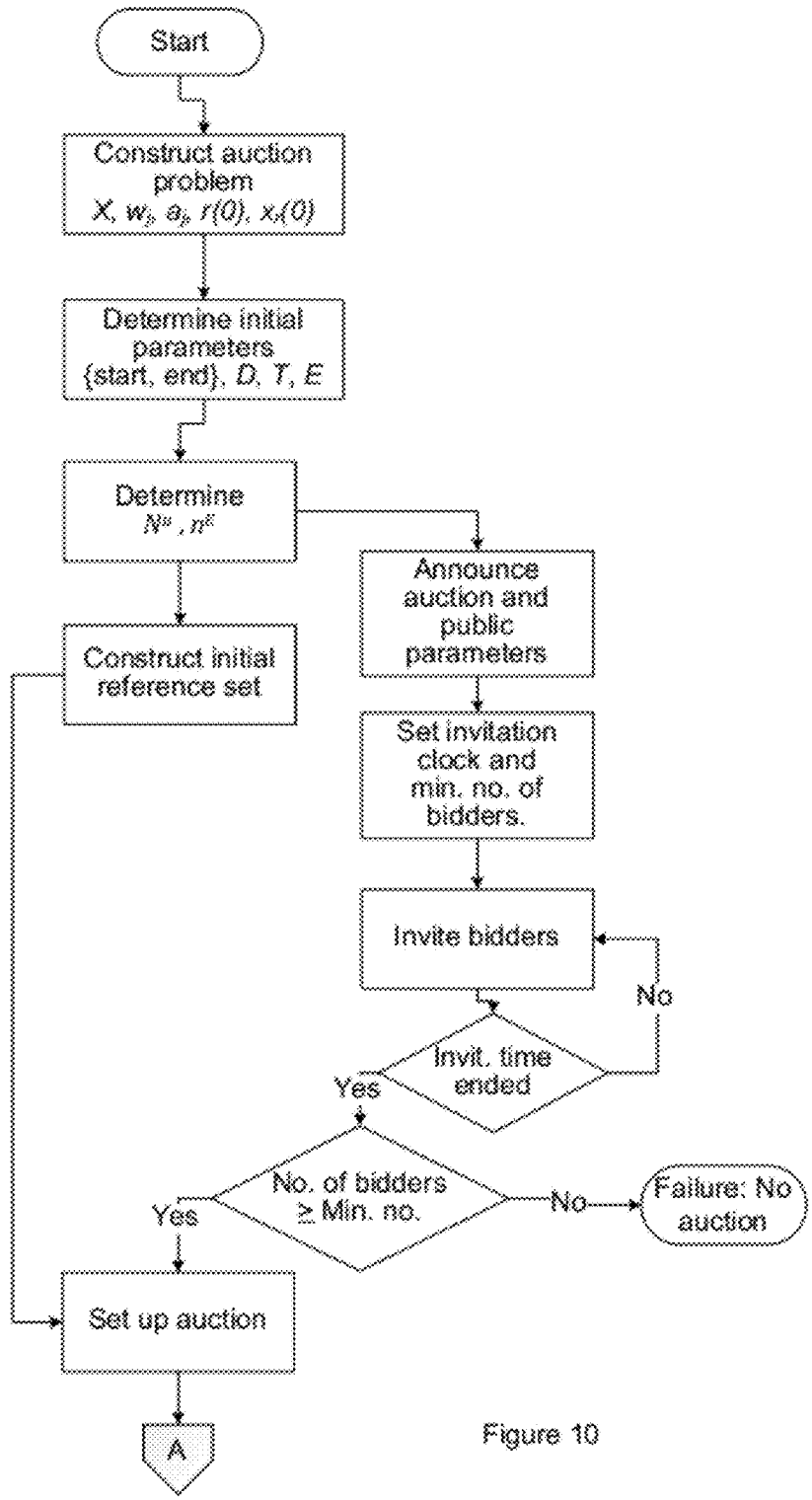
FIG. 10 is a flow diagram illustrating a method for setting up an auction with the auctioning system, according to an embodiment.

As presented in FIG. 10, in order to initiate the auction several design parameters must be set.

Step 1.

The parameter D value is equal to the number of attributes (i.e. D=3). The values of parameter $e = [e_1, e_2, e_3]$ are determined as follows. $e_1$ corresponds to the nominal variable (trademark) and therefore it is not set. $e_2$ is 12 months, and $e_3$ is $800. This selection of the attribute value increment reduces the space of alternatives from 1.44 million to 1,836 distinct alternatives.

Step 2.

The number $N^u$ of points sufficient to define the buyer's utility function u is determined. Two attributes (Price and Warranty) have linear partial utility functions.

The attribute Trademark is nominal and neither the order of its values nor the preferential distance between the different trademarks is known. Therefore, knowledge of as many alternatives of equal utility value as there are attribute values (i.e., trademarks) is required to determine partial utility. This means that $N^u = 2 + 5$; because trademark Star is not acceptable, $N^u = 6$.

If perturbation is required, then one attribute value will be changed, i.e., $n^E = 1$.

Step 3.

Round counter is set to 1, (t=1). The initial reservation levels are used to construct the initial set of acceptable bids $X_{DE}^{A1}$.

$$X_{DE}^{A1} = \{X_1^1; x_2 \geq 12; x_3 \leq 50,000\},$$

where $X_1^1 = $ {Citron; Pejo; Betha; Reno; Lux}. (Note that the minimum acceptable utility value is 10; it is the utility of [Citron; 12; 50000]).

The auction is now open and the bidders are asked to submit their bids.

Figure 16:
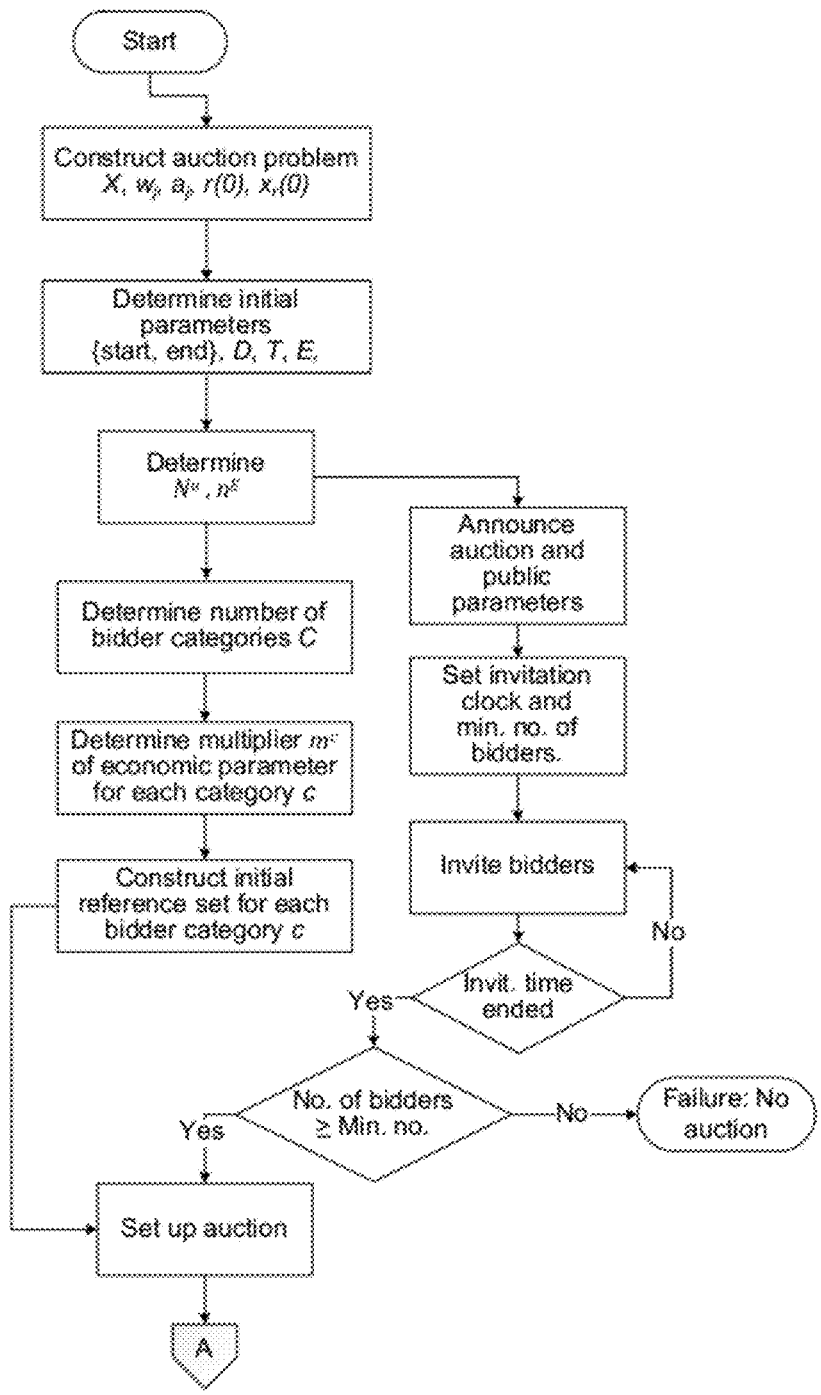
FIG. 16 is a flow diagram illustrating a method of auctioning of different categories of bidders and presenting each category with different alternate combinations of attribute values and required biding directions, according to the embodiment.

According to an alternate embodiment, there is illustrated in FIG. 16 the steps for setting up an auction in which there are multiple categories of bidders. The number of bidder categories C is determined and for each category of bidders there is determined a multiplier of economic parameter and an initial set of acceptable bids.

Exchange of Bids and Reservation Levels

Figure 11A:
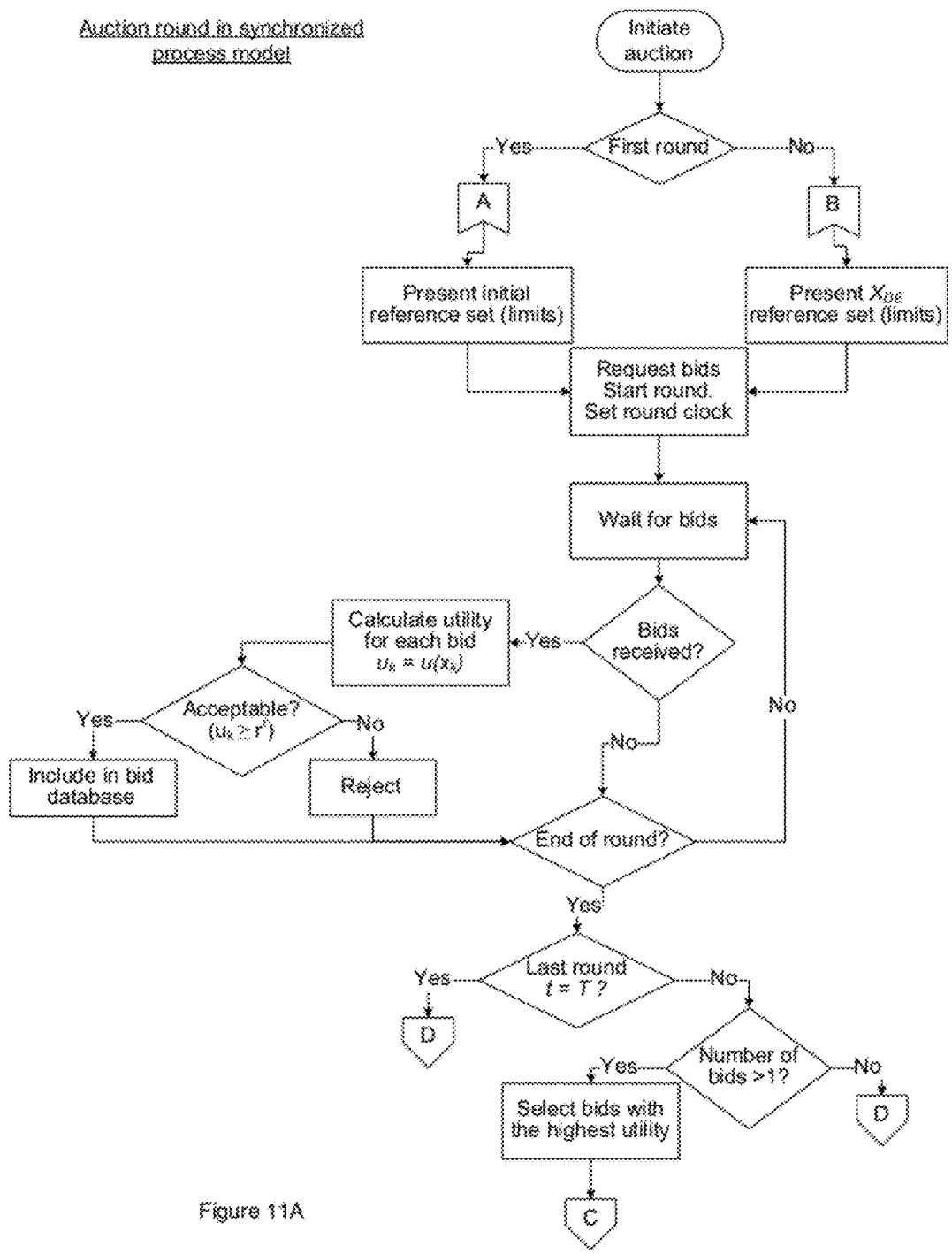
FIG. 11A is a flow diagram illustrating a method for running a synchronous auction with the auctioning system, according to an embodiment.
Figure 11B:
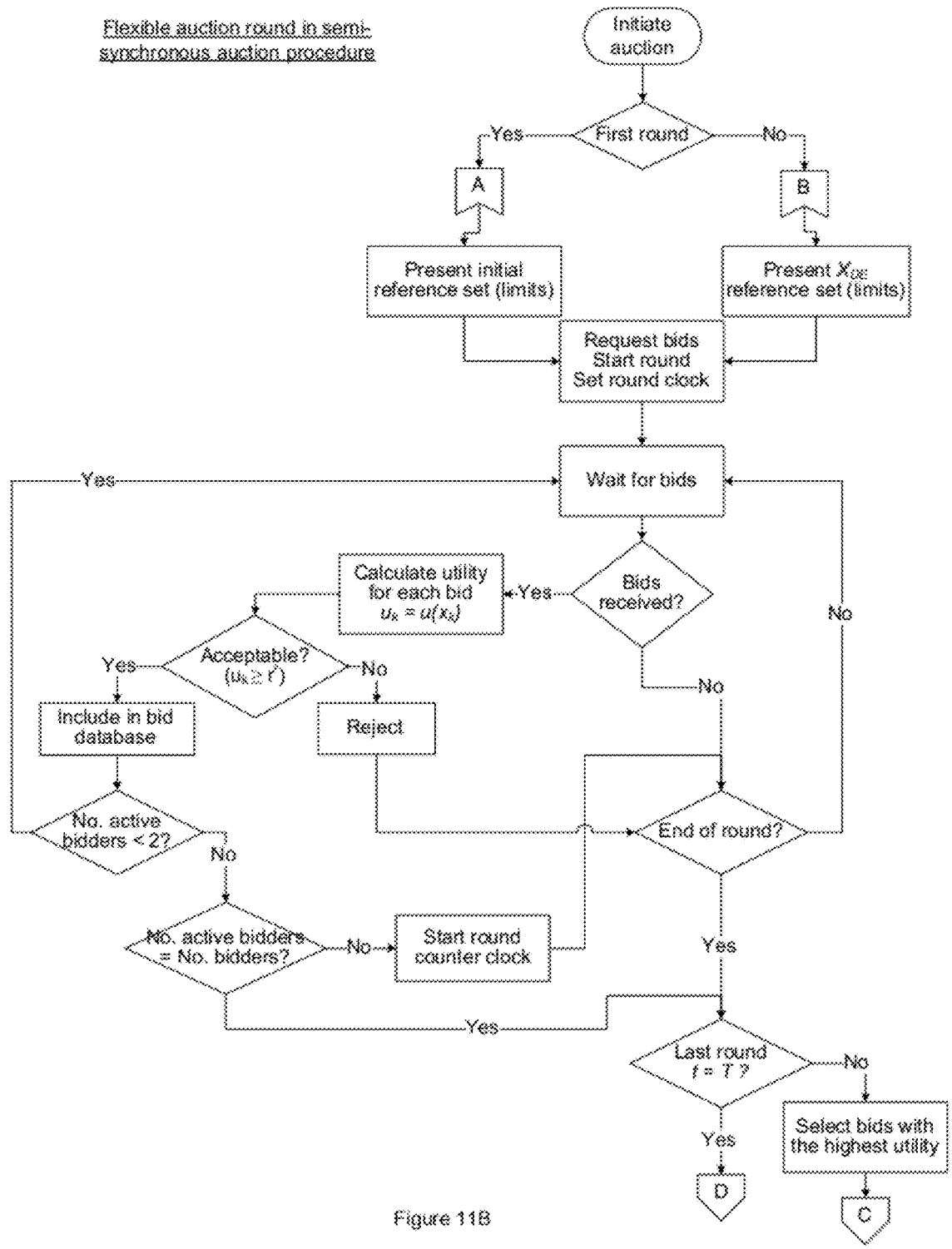
FIG. 11B is a flow diagram illustrating a method for running a semi-synchronous auction with the auctioning system, according to an embodiment.

Presented in FIG. 11A, there is illustrated various steps of an auction round, according to one embodiment. The following describes an example of an auction round using the steps illustrated in FIG. 11A. This example is also applicable to the steps illustrated in FIG. 11B, except the round duration that may be different.

Three sellers (J=3) submitted bids.

Step 4.

The following bids were submitted: $O_{11} = $[Pejo; 24; 46,000]; $O_{21} = $[Reno; 12; 50,000]; and $O_{31} = $[Betha; 24; 47,600].

The buyer's utility of each bid is respectively: $u(O_{11}) = 25$; $u(O_{21}) = 22$; $u(O_{31}) = 29$. Hence, the best bid was made by the third bidder (j=3). We set $x_r^{1*} = $[Betha; 24; 47,600].

Step 5.

The auction moves to the next round, i.e., t=2. The reservation level in round 2 is 29, ($r^2 = 29$).

Figure 12:
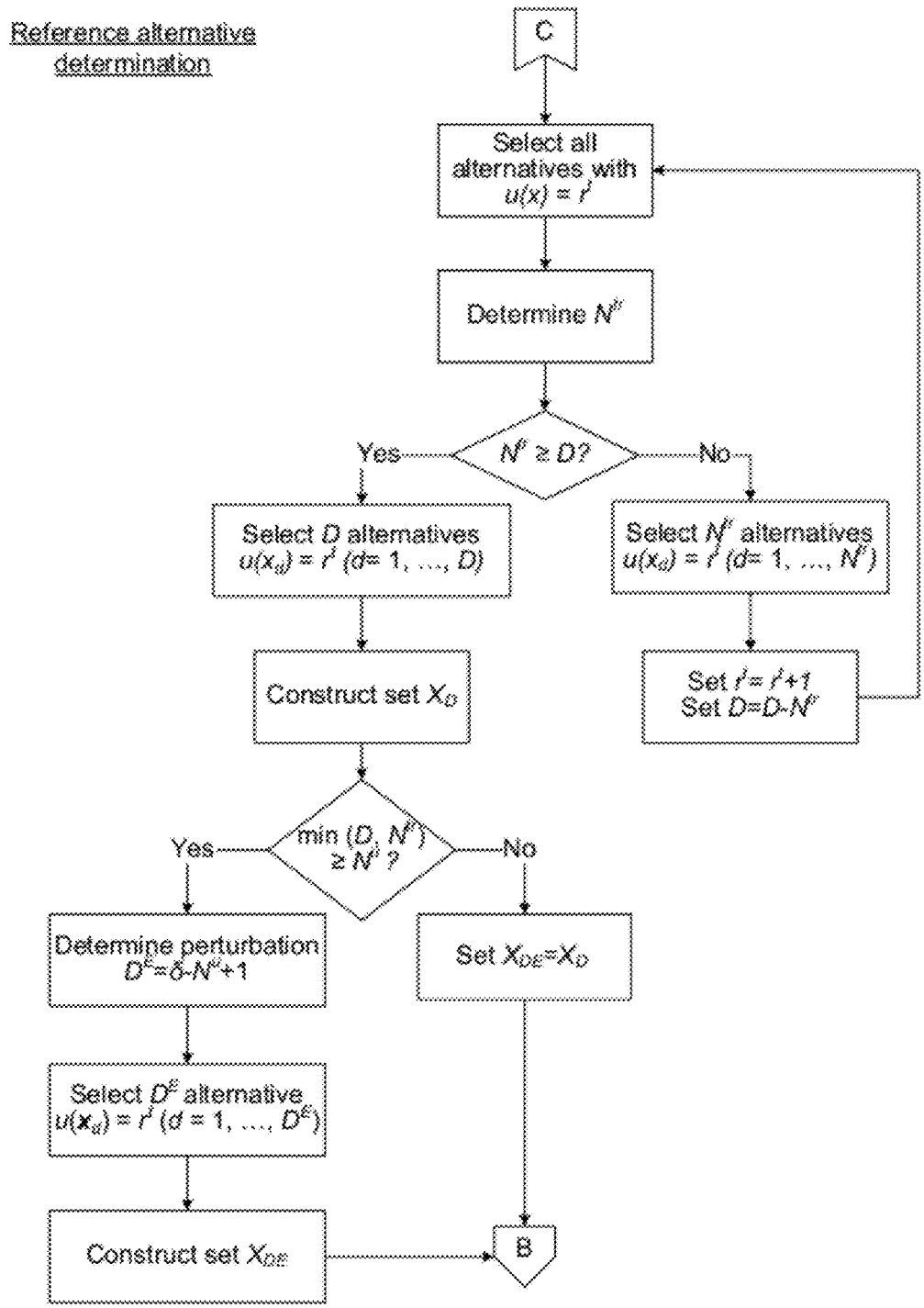
FIG. 12 is a flow diagram illustrating a method for calculating the alternate combinations of attribute values, according to an embodiment.

Presented in FIG. 12, there is illustrated various step for determining a reference alternative, according to an embodiment. The following is an example where a reference alternative is determined with the steps illustrated in FIG. 12.

Step 6.

In order to select reference alternatives, first the number $N^{2r}$ of alternatives yielding utility $r^2 = 29$ needs to be determined. There are three such alternatives:

$u(x_1) = u[\text{Betha}; 24; 47,600] = 29$;
$u(x_2) = u[\text{Pejo}; 24; 42,800] = 29$; and
$u(x_3) = u[\text{Pejo}; 36; 46,000] = 29$.

Because $N^{1r} = 3 \geq D = 3$, the above three alternatives are selected for the construction of set $X_D^{A2}$. The process moves to Step 8.

Step 8.

Each of the alternatives $x_1$, $x_2$ and $x_3$ is used to construct set of r-acceptable alternatives.

From the table of FIG. 14A we see that, if Betha is the worst acceptable alternative, then there are only two trademarks preferred over Betha, that is $X_1^2 = \{\text{Betha}; \text{Reno}; \text{Lux}\}$. Similarly, for Pejo trademark we obtain $X_2^2 = X_3^2 = \{\text{Pejo}; \text{Betha}; \text{Reno}; \text{Lux}\}$.

The set of acceptable alternatives $X_D^{A2}$ is the union of three sets:

a. $X_D^{A2} = X_{D1}^{A2} \cup X_{D2}^{A2} \cup X_{D2}^{A2} = \{X_{11}^2; x_2 \geq 24; x_3 \leq 47,600\} \cup$
b. $\cup \{X_{12}^2; x_2 \geq 24; x_3 \leq 42,800\} \cup \{X_1^2; x_2 \geq 36; x_3 \leq 46,000\}$.

Step 9.

In this step we need to determine perturbation. Because $\delta = \min(D, N^{1r}) = 3 < N^u = 6$, perturbation is not required. For illustrative purposes we show how one of the alternatives selected in Step 6 can be perturbed.

Step 10.

Select one ($n^E = 1$) attribute n for which an increase of its value by $e_n$ increases the alternative utility value the least. Any change for Trademark increases the utility by 6 (0.3×20). An increase of Warranty by 12 months increases the utility by 4 (0.2×20) and a decrease of Price by $800 increases the utility by 1 (0.5×2). Therefore attribute Price is selected. (Note that the preferential direction for price is decreasing.)

From among the three alternatives ($x_1$, $x_2$ and $x_3$) determined in Step 3 select one for which attribute Price takes the highest value. The highest value is selected because of the preferential direction. If the minimum partial utility was minimal for Warranty, then the lowest value would be selected. This rule is appropriate for linear partial utility functions and when the partial utility values between any two values of a nominal attribute are equal or very close. This is alternative $x_1$ and its Price attribute is decreased by $e_3 = \$800$. This perturbation of $x_1$ is used to replace set:

$X_{D1}^{A2} = \{X_{12}^2; x_2 \geq 24; x_3 \leq 47,600\}$ with
$X_{D1E}^{A2} = \{X_{12}^2; x_2 \geq 24; x_3 \leq 46,800\}$.
Set $X_{DE}^{A2} = X_{D1E}^{A2} \cup X_{D2}^{A2} \cup X_{D3}^{A2}$.

Step 11.

Present the bidders with the new reservation levels, that is set $X_{DE}^{A2}$, and request bids.

Step 11 completes the second auction round. By moving to Step 4, the next, third, round is initiated. The rounds continue until there is only one bidder left.

Figure 13:
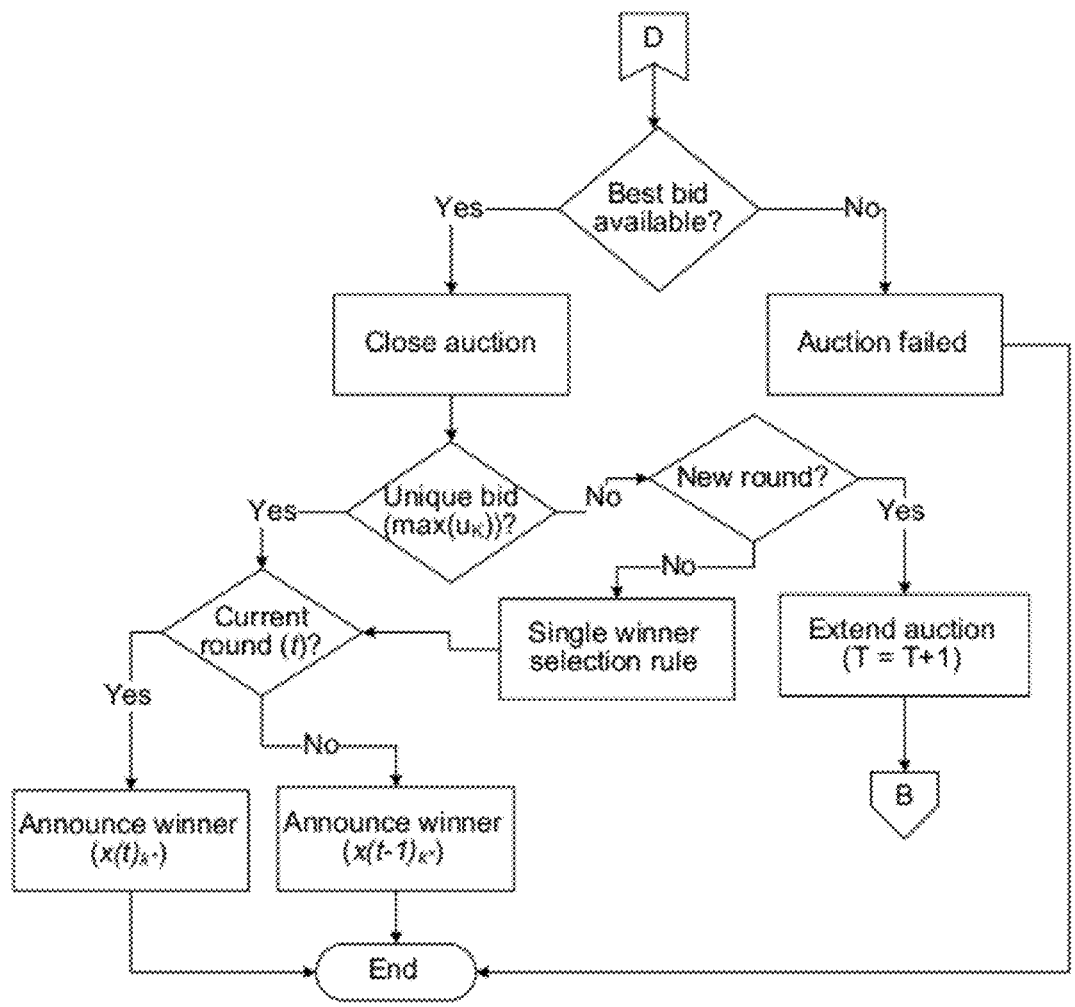
FIG. 13 is a flow diagram illustrating a method for determining a winning bid, according to an embodiment.

Presented in FIG. 13, there is illustrated the steps for determining an auction winner, according to an embodiment.

Example of the Non-Homogenous Bidders

A seller of the best type (h=2) made a bid $x^*_{t,2}$ which utility is $u^*_{t,2} = u(x^*_{t,2})$. The best bid by a seller from group 1 is $x^*_{t,1}$. The utility of this bid $u(x^*_{t,1})$ is greater than $u(x^*_{t,2})$, but it is lower than $u(x^*_{t,2})/w_1$. Therefore, $\xi_t = x^*_{t,2}$ and $u^*_{t,2}$ is used as the basis for the construction of the limit sets for the next round.

Figure 15:
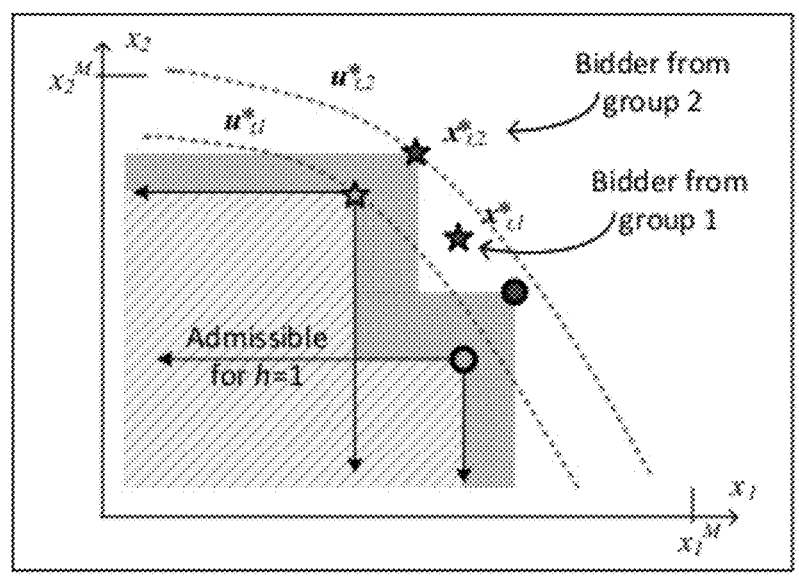
FIG. 15 presents a graph illustrating a differentiation between two categories of bidders based on their innate attributes rather than attributes of the goods or service under consideration, according to the embodiment.

The limit-set for members of group 2 are the same as in the example shown in FIG. 4. For group 1 the required value of utility is calculated so that it is equivalent to utility of group 1, i.e., $u^*_{t,1} = u^*_{t,2}/w_1$. Selecting two points yielding this utility value and distorting one of them allows for the construction of limit-sets containing admissible bids for members of group 1. The admissible area is shown in FIG. 15.

The shaded area contains the bids which are admissible to group 2 members but inadmissible to group 1 members. The latter need to make bids which yield higher utility.

In addition, the bidder-differentiation process needs not rely on utility or any economic function. Instead selected attributes can be used. This allows viewing some bidders as not reliable on time delivery and others on quality. If the buyer wants to take bids made by such sellers into account, then she needs to determine attributes on which these sellers must exceed other, more reliable sellers.

The following references, some of which are referred to above are of background interest to the present specification.

Anderson, J. and M. Frohlich (2001). "FreeMarkets and Online Auctions." *Business Strategy Review* 12(2): 59-68.

Beil, D. and L. Wein (2003). "An Inverse-optimization-based Auction Mechanism to Support a Multiattribute RFQ Process." *Management Science* 49(11): 1529-1545.

Bellosta, M. J., I. Brigui, et al. (2004). "A Multicriteria Model for Electronic Auions." ACM Symposium on Applied Computing (SAC'04).

Bellosta, M. J., S. Kornman, et al. (2008). "A Unified Framework for Multiple Criteria Auction Mechanisms." *Web Intelligence and Agent Systems* 6(4): 401-419.

Bichler, M. (2000). "An Experimental Analysis of Multi-attribute Auctions." *Decision Support Systems* 29(3): 249-268.

Bichler, M. (2001). *The Future of E-markets: Multidimensional Market Mechanisms*. Cambridge University Press.

Bichler, M. and J. Kalagnanam (2005). "Configurable Offers and Winner Determination in Multi-attribute Auctions." *European Journal of Operational Research* 160(2): 380-394.

Brigui-Chtioui, I. and S. Pinson (2010). "A Variable Bid Increment Algorithm for Reverse English Auction." Progress in Artificial Economics, Springer.

Burmeister, B., T. Ihde, et al. (2002). "A Practical Approach to Multi-attribute Auctions." 13th Workshop on Database and Expert Systems Applications (DEXA), IEEE.

Che, Y. K. (1993). "Design Competition through Multidimensional Auctions." *The RAND Journal of Economics* 24(4): 668-680.

Chen-Ritzo, C. H., T. P. Harrison, et al. (2005). "Better, Faster, Cheaper: An Experimental Analysis of a Multiattribute Reverse Auction Mechanism with Restricted Information Feedback." *Management Science* 51(12): 1753-1762.

Dhar, R. (1996). "The Effect of Decision Strategy on Deciding to Defer Choice." *Journal of Behavioral Decision Making* 9: 265-281.

Dieckmann, A., K. Dippold, et al. (2009). "Compensatory versus Noncompensatory Models for Predicting Consumer Preferences." *Judgment and Decision Making* 4(3): 200-213.

Elmaghraby, W. (2004). "Auctions and Pricing in E-marketplaces." in *Handbook of Quantitative Supply Chain Analysis: Modeling in the E-business Era*. D. Simchi-Levi, D. Wu and M. Shen Eds.), Norwell, Kulwer.

Engel, Y. and M. P. Wellman (2010). "Multiattribute Auctions based on Generalized Additive Independence." *Journal of Artificial Intelligence Research* 37(1): 479-526.

Engelbrecht-Wiggans, R., E. Haruvy, et al. (2007). "A Comparison of Buyer-determined and Price-based Multi-attribute Mechanisms." *Marketing Science* 26(5): 629-641.

Ferrin, B. G. and R. E. Plank (2002). "Total Cost of Ownership Models: An Exploratory Study." *Journal of Supply Chain Management* 38(3): 18-29.

Fishburn, P. C. (1976). "Noncompensatory Preferences." *Synthese* 33: 393-403.

Jap, S. D. (2003). "An Exploratory Study of the Introduction of Online Reverse Auctions."*Journal of Marketing* 67(3): 96-107.

Karakaya, G. and M. Köksalan (2011). "An interactive approach for multi-attribute auctions." *Decision Support Systems* 51(2): 299-306.

Katok, E. and A. Wambach (2011). "Collusion in Dynamic Buyer-Determined Reverse Auctions." *Management Science: forthcoming*.

Kittsteiner, T. and A. Ockenfels (2006). "Market Design: A Selective Review." *Zeitschrift für Betriebswirtschaft* 5: 121-143.

Milgrom, P. and R. Weber (1982). "A Theory of Auctions and Competitive Bidding."*Econometrica* 50(5): 1089-1122.

Parkes, D. C. and J. Kalagnanam (2005). "Models for Iterative Multiattribute Procurement Auctions." *Management Science* 51(3): 435-451.

Peleg, B. (2003) "The Value of Procurement via Online Bidding." *Whitepaper*, 3.

Schoenherr, T. and V. A. Mabert (2007). "Online Reverse Auctions: Common Myths versus Evolving Reality."*Business Horizons* 50(5): 373-384.

Srinath, T., M. P. Singh, et al. (2011). "Anonymity and verifiability in multi-attribute reverse auction." *International Journal of Information Technology Convergence and Services* 1(4): 1-8.

Strecker, S. and S. Seifert (2004). "Electronic Sourcing with Multi-attribute Auctions."*HICSS 37*, Hawaii.

Talluri, S. and G. Ragatz (2004). "Multi-attribute Reverse Auctions in B2B Exchanges: A Framework for Design and Implementation." *Journal of Supply Chain Management* 40(1): 52-60.

Teich, J. E., H. Wallenius, et al. (1999). "Multiple Issue Auction and Market Algorithms for the World Wide Web." *Decision Support Systems* 26: 49-66.

Teich, J. E., H. Wallenius, et al. (2004). "Emerging Multiple Issue E-auctions." *European Journal of Operational Research* 159(1): 1-16.

Wagner, S. M. and A. P. Schwab (2004). "Setting the Stage for Successful Electronic Reverse Auctions." *Journal of Purchasing and Supply Management* 10(1): 11-26.

Walley, M. J. C. and D. R. Fortin (2005). "Behavioral Outcomes from Online Auctions: Reserve Price, Reserve Disclosure, and Initial Bidding Influences in the Decision Process." *Journal of Business Research* 58(10): 1409-1418.

Yee, M., E. Dahan, et al. (2007). "Greedoid-based Noncompensatory Inference." *Marketing Science* 26: 532-549.

What is claimed is:

1. A method for auctioning an auction item in a multi-attribute auction in which bids are iteratively offered to an auction owner by a plurality of bidders, the method comprising:

determining a secret value function that is indicative of acceptable combination of attribute values for the auction owner to select a bid winner;

receiving a bid value for each of a plurality of attributes, the bid value being determined by the bidder without knowledge of the secret value function;

calculating in a processor a secret bid ranking for each bid value received according to the secret value function and determining at least a winning bid;

generating in a processor alternate combinations of attribute values that are based at least in part on the secret value function wherein at least some of the combinations of attribute values are perturbed to hinder the plurality of bidders from deriving the secret value function;

informing the plurality of bidders about the alternate combinations of attribute values for allowing them to offer in a next round a bid that is based on the alternate combinations of attribute values.

2. The method of claim 1, wherein the at least some of the combinations of attribute values are perturbed also to allow the auction to be progressive.

3. The method of claim 1, wherein the combinations of attribute values are perturbed at least in part by applying an increment function to the secret value function.

4. The method of claim 1, further comprising receiving an alternate bid ranking request for a proposed combination of attribute values, calculating an alternate bid ranking for the proposed combination of attribute values based on the alternate combinations of attribute values and sending the calculated alternate bid ranking.

5. The method of claim 1, wherein the alternate combinations of attribute values are also based on a best bid of a bidding round and the best bid is included in the alternate combinations of attributes.

6. The method of claim 1, further comprising maintaining the bid for a subsequent bidding round according to the generated alternate combinations.

7. The method of claim 1, further comprising receiving a bid value for each of the plurality of attributes, the bid value being determined by the bidder based on the alternate combinations of attribute values, without knowledge of the secret value function.

8. The method of claim 1, further comprising selecting a bid winner by comparing the bids received to the secret value function.

9. The method of claim 1, wherein the generating alternate combinations of attribute values is performed by a server computing device.

10. The method of claim 1, wherein the informing the plurality of bidders about the alternate combinations of attribute values through a bidder interface of a client computing device.

11. The method of claim 1, wherein the bids are iteratively offered to an auction owner through an auction owner interface of a client computing device by a plurality of bidders through the bidder interface of a client computing device.

12. The method of claim 1, wherein in a bidding round at least one of the plurality of bidders is required to bid for ending the bidding round according to a counter clock.

13. A multi-attribute auction system allowing bids to be iteratively offered to an auction owner by a plurality of bidders, the auction system comprising:

a processor;

a memory associated with said processor storing computer program instructions and configured to provide:

a value function calculator adapted to calculate a secret value function based on acceptable combinations of attribute values for the auction owner;

a bid collector adapted to receive a bid indicative of a combination of attribute values offered by the bidder without knowledge of the secret value function;

a ranking module adapted to compare each of the bids received with using the secret value function and determine at least a winning bid;

a value function perturbator adapted to generate alternate combinations of attribute values that are based at least in part on the secret value function wherein at least some of the combinations of attribute values are perturbed to hinder the plurality of bidders from deriving the secret value function; and a guiding module adapted to send at least some of the alternate combinations of attribute values to each of the plurality of bidders.

14. The auction system of claim 13, further comprising a bidder value function calculator adapted to calculate a bidder value function based at least in part on acceptable combinations of attribute values for the bidder.

15. The auction system of claim 14, wherein the bidder value function calculator is adapted to calculate a bidder value function based also on the acceptable combinations of attribute values for the auction owner.

16. The auction system of claim 13, wherein the bidder value function calculator is adapted to calculate a bidder value function based also on the alternate combinations of attribute values.

17. The method of claim 1, further comprising calculating an alternate bid ranking for each bid based on alternate combinations of attribute values and informing each bidder of the plurality of bidders about a best bid determined according to the alternate bid ranking.

18. The method of claim 1 further comprising receiving a bidder value function that is indicative of acceptable combination of attribute values for the bidder and determining a bid ranking of the best bid according to the bidder value function.

* * * * *